US012057076B2

(12) United States Patent
Lee et al.

(10) Patent No.: US 12,057,076 B2
(45) Date of Patent: Aug. 6, 2024

(54) DISPLAY DEVICE INCLUDING LEVEL SHIFTER GENERATING GATE CLOCK SIGNALS SYNCHRONIZED WITH RISING EDGE AND FALLING EDGE OF CLOCK SIGNAL

(71) Applicant: Samsung Display Co., Ltd., Yongin-Si (KR)

(72) Inventors: Dae-Sik Lee, Hwaseong-si (KR); Siduk Sung, Hwaseong-si (KR); Songyi Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/086,762

(22) Filed: Dec. 22, 2022

(65) Prior Publication Data

US 2023/0419910 A1 Dec. 28, 2023

(30) Foreign Application Priority Data

Jun. 27, 2022 (KR) ........................ 10-2022-0078373

(51) Int. Cl.
*G09G 3/30* (2006.01)
*G09G 3/3266* (2016.01)

(52) U.S. Cl.
CPC ... *G09G 3/3266* (2013.01); *G09G 2310/0289* (2013.01); *G09G 2310/08* (2013.01); *G09G 2330/02* (2013.01); *G09G 2330/025* (2013.01); *G09G 2330/04* (2013.01); *G09G 2330/12* (2013.01)

(58) Field of Classification Search
CPC ......... G09G 3/3266; G09G 2310/0289; G09G 2310/08; G09G 2330/02; G09G 2330/12; G09G 2330/04; G09G 2330/025
See application file for complete search history.

(56) References Cited

U.S. PATENT DOCUMENTS

| | | | |
|---|---|---|---|
| 9,570,027 | B2 | 2/2017 | Kim et al. |
| 11,087,691 | B2 | 8/2021 | Nam et al. |

(Continued)

FOREIGN PATENT DOCUMENTS

| | | | | |
|---|---|---|---|---|
| KR | 1020170068073 A | * | 6/2017 | ............... G09G 3/20 |
| KR | 10-2019-0030422 A | | 3/2019 | |

(Continued)

*Primary Examiner* — Adam J Snyder
(74) *Attorney, Agent, or Firm* — Innovation Counsel LLP

(57) ABSTRACT

A display device may include a timing controller which generates on-clock and off-clock signals, a level shifter which sequentially generates gate clock signals each having a rising edge and a falling edge respectively synchronized with a rising edge of the on-clock signal and a falling edge of the off-clock signal, the gate clock signals having a voltage corresponding to a gate driving voltage, a gate driver generating gate signals based on the gate clock signals, an over-current detector detecting an over-current by sensing a current of each of the gate clock signals at a time point when the falling edge of the on-clock signal is generated in an on-current detection mode, and generates a shutdown signal in response to the detected over-current, and a voltage generator providing the gate driving voltage to the level shifter and stops providing the gate driving voltage in response to the generated shutdown signal.

20 Claims, 16 Drawing Sheets

(56) References Cited

U.S. PATENT DOCUMENTS

| | | | | |
|---|---|---|---|---|
| 2017/0316728 | A1* | 11/2017 | Lee | G09G 3/3677 |
| 2019/0081471 | A1* | 3/2019 | Park | H02H 3/08 |
| 2022/0208111 | A1* | 6/2022 | Baek | G09G 3/3266 |

FOREIGN PATENT DOCUMENTS

| | | | |
|---|---|---|---|
| KR | 10-2019-0031938 | A | 3/2019 |
| KR | 10-2021-0055860 | A | 5/2021 |
| KR | 10-2021-0093422 | A | 7/2021 |

* cited by examiner

DISPLAY DEVICE INCLUDING LEVEL SHIFTER GENERATING GATE CLOCK SIGNALS SYNCHRONIZED WITH RISING EDGE AND FALLING EDGE OF CLOCK SIGNAL

CROSS-REFERENCE TO RELATED APPLICATION(S)

This application claims priority under 35 USC § 119 to Korean Patent Application No. 10-2022-0078373 filed on Jun. 27, 2022, in the Korean Intellectual Property Office (KIPO), the entire disclosure of which is incorporated by reference herein.

BACKGROUND

1. Field

Embodiments relate to a display device.

2. Description of the Related Art

A display device may include a display panel including pixels, gate lines, and data lines, a gate driver providing gate signals to the gate lines, a data driver providing data voltages to the data lines, and a timing controller controlling an operation of the gate driver and an operation of data driver. The display device may further include a level shifter generating gate clock signals for generating the gate signals and an over-current detector detecting an over-current of each of the gate clock signals.

The level shifter may output the gate clock signals provided to the gate driver based on input signals provided from the timing controller. However, the number of input terminals of the level shifter may increase when the number of the input signals of the level shifter increases, and accordingly, the size of the level shifter may increase.

The over-current detector may detect the over-current by sensing a current of each of the gate clock signals. However, the over-current may not be accurately detected when deviation occurs at a time point of sensing the current, and accordingly, the display device may be damaged by the over-current.

SUMMARY

Embodiments provide a display device in which the number of input signals of a level shifter decreases and deviation in time points when an over-current is detected decreases. A display device according to embodiments may include a timing controller which generates an on-clock signal and an off-clock signal, a level shifter which sequentially generates gate clock signals each having a rising edge and a falling edge respectively synchronized with a rising edge of the on-clock signal and a falling edge of the off-clock signal, the gate clock signals having a voltage corresponding to a gate driving voltage, a gate driver which generates a plurality of gate signals based on the gate clock signals, a display panel which includes a plurality of pixels emitting light, an over-current detector which detects an over-current by sensing a current of each of the gate clock signals at a time point when the falling edge of the on-clock signal is generated in an on-current detection mode, and generates a shutdown signal in response to the detected over-current, and a voltage generator which provides the gate driving voltage to the level shifter and stops providing the gate driving voltage in response to the generated shutdown signal.

In an embodiment, the level shifter may generate the same number of gate clock signals as a preset number of channels.

In an embodiment, the preset number of the channels may be a natural number of 2 to 8.

In an embodiment, the timing controller may generate a start signal. The level shifter may sequentially generate the gate clock signals in response to a pulse of the start signal in a reset-on mode.

In an embodiment, a rising edge of the first gate clock signal may be disposed between a rising edge of the start signal and a falling edge of the start signal.

In an embodiment, the level shifter may gradually decrease a pulse included in each of the gate clock signals from a first voltage level to a second voltage level lower than the first voltage level from a rising edge of the off-clock signal to the falling edge of the off-clock signal in a kickback-on mode.

In an embodiment, the over-current detector may detect the over-current by sensing a current of each of the gate clock signals at the rising edge of the on-clock signal and at the falling edge or the rising edge of the off-clock signal in an off-current detection mode.

In an embodiment, the over-current detector may detect the over-current by sensing a current of each of the gate clock signals at the rising edge of the on-clock signal and at the falling edge of the off-clock signal in the off-current detection mode and a kickback-off mode.

In an embodiment, the over-current detector may detect the over-current by sensing a current of each of the gate clock signals at the rising edge of the on-clock signal and at the rising edge of the off-clock signal in the off-current detection mode and the kickback-on mode.

In an embodiment, the timing controller may generate a gate enable signal. The level shifter may generate a gate clock signal including a pulse having a rising edge and a falling edge respectively synchronized with the rising edge of the on-clock signal and the falling edge of the off-clock signal while the gate enable signal has a first voltage level. The level shifter may generate a gate clock signal not including the pulse while the gate enable signal has a second voltage level different from the first voltage level.

A display device according to embodiments may include a timing controller which generates clock signals including an on-clock signal and an off-clock signal, a level shifter which sequentially generates gate clock signals each having a rising edge and a falling edge respectively synchronized with a rising edge of the on-clock signal and a falling edge of the off-clock signal, a gate driver which generates a plurality of gate signals based on the gate clock signals, and a display panel which includes a plurality of pixels emitting light.

In an embodiment, the number of the gate clock signals may be greater than or equal to the number of the clock signals.

In an embodiment, the number of the gate clock signals may be a natural number of 2 to 8.

In an embodiment, the timing controller may generate a start signal. The level shifter may sequentially generate the gate clock signals in response to a pulse of the start signal in a reset-on mode.

In an embodiment, the level shifter may gradually decrease a pulse included in each of the gate clock signals from a first voltage level to a second voltage level lower than the first voltage level from a rising edge of the off-clock signal to the falling edge of the off-clock signal in a kickback-on mode.

In an embodiment, the timing controller may generate a gate enable signal. The level shifter may generate a gate clock signal including a pulse having a rising edge and a falling edge respectively synchronized with the rising edge of the on-clock signal and the falling edge of the off-clock signal while the gate enable signal has a first voltage level. The level shifter may generate a gate clock signal not including the pulse while the gate enable signal has a second voltage level different from the first voltage level.

A display device according to embodiments may include a timing controller which generates an on-clock signal and an off-clock signal, a level shifter which sequentially generates gate clock signals each having a rising edge and a falling edge respectively synchronized with a rising edge of the on-clock signal and a falling edge of the off-clock signal, the gate clock signals having a voltage corresponding to a gate driving voltage, a gate driver which generates a plurality of gate signals based on the gate clock signals, a display panel which includes a plurality of pixels emitting light, an over-current detector which detects an over-current by sensing a current of each of the gate clock signals at the rising edge of the on-clock signal and at the falling edge or a rising edge of the off-clock signal in an off-current detection mode, and generates a shutdown signal in response to the detected over-current, and a voltage generator which provides the gate driving voltage to the level shifter and stops providing the gate driving voltage in response to the generated shutdown signal.

In an embodiment, the level shifter may gradually decrease a pulse included in each of the gate clock signals from a first voltage level to a second voltage level lower than the first voltage level from the rising edge of the off-clock signal to the falling edge of the off-clock signal in a kickback-on mode.

In an embodiment, the over-current detector may detect the over-current by sensing a current of each of the gate clock signals at a time point when the rising edge of the on-clock signal is generated and at the rising edge of the on-clock signal and at the falling edge of the off-clock signal in the off-current detection mode and a kickback-off mode.

In an embodiment, the over-current detector may detect the over-current by sensing a current of each of the gate clock signals at a time point when the rising edge of the on-clock signal is generated and at the rising edge of the on-clock signal and at the rising edge of the off-clock signal in the off-current detection mode and the kickback-on mode.

In the display device according to the embodiments, the level shifter may sequentially generate the plurality of gate clock signals based on the on-clock signal and the off-clock signal, so that the number of the input signals of the level shifter may decrease. Further, the over-current detector may sense the current of the gate clock signals at the rising edge or the falling edge of the on-clock signal and/or at the rising edge or the falling edge of the off-clock signal, so that deviation in the time points when the over-current is detected may decrease.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
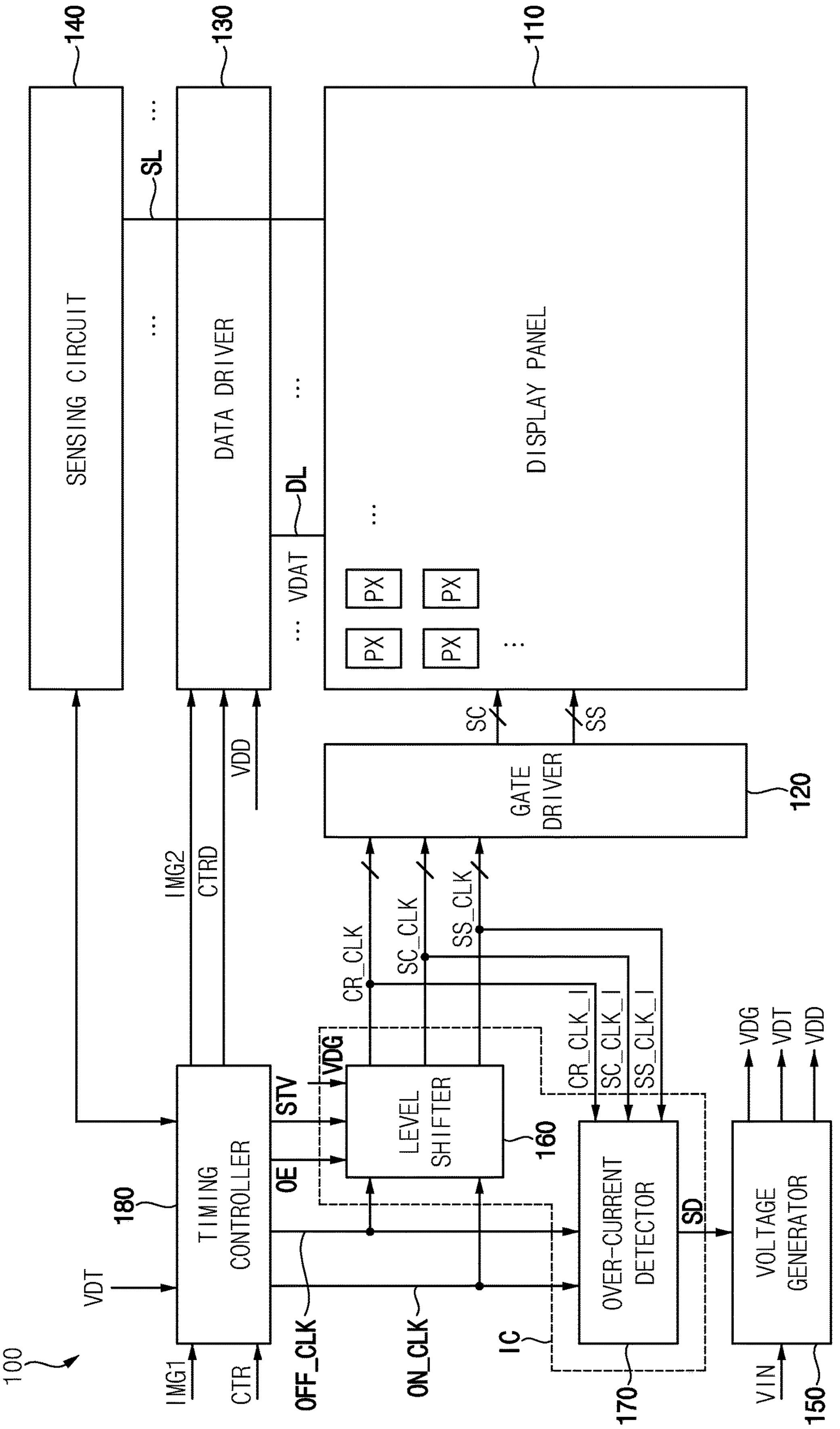
FIG. 1 is a block diagram illustrating a display device according to an embodiment.

Hereinafter, a display device according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment.

Referring to FIG. 1, a display device 100 may include a display panel 110, a gate driver 120, a data driver 130, a sensing circuit 140, a voltage generator 150, a level shifter 160, an over-current detector 170, and a timing controller 180.

The display panel 110 may include various display elements such as organic light emitting diode ("OLED") or the like. Hereinafter, the display panel 110 including the organic light emitting diode as a display element will be described for convenience. However, the present disclosure is not limited thereto, and the display panel 110 may include various display elements such as a liquid crystal display ("LCD") element, an electrophoretic display ("EPD") element, an inorganic light emitting diode, a quantum dot light emitting diode, or the like.

The display panel 110 may include a plurality of pixels PX. The pixels PX may receive gate signals and data voltages VDAT. In an embodiment, the gate signals may include first gate signals SC and second gate signals SS. Hereinafter, the first gate signals SC and the second gate signals SS will be referred to as scan signals SC and sensing signals SS, respectively. The pixels PX may emit light based on the scan signals SC, the sensing signals SS, and the data voltages VDAT.

The gate driver 120 may generate the scan signals SC and the sensing signals SS based on gate clock signals CR_CLK, SC_CLK, and SS_CLK, and may provide the scan signals SC and the sensing signals SS to the pixels PX. In an embodiment, the gate driver 120 may be formed on the display panel 110. In another embodiment, the gate driver 120 may be implemented as an integrated circuit and may be mounted on a flexible circuit board which is connected to the display panel 110.

The data driver 130 may generate the data voltages VDAT based on output image data IMG2, a data control signal CTRD, and a data driving voltage VDD, and may provide the data voltages VDAT to the pixels PX through data lines DL. The data voltages VDAT may correspond to the output image data IMG2. The data control signal CTRD may include a data clock signal, a data enable signal, or the like. In an embodiment, the data driver 130 may be implemented as an integrated circuit and may be mounted on a flexible circuit board which is connected to the display panel 110.

The sensing circuit 140 may perform a sensing operation on the pixels PX through sensing lines SL. For example, for each of the pixels PX, the gate driver 120 may provide the scan signal SC and the sensing signal SS, the data driver 130 may provide a sensing data voltage as the data voltage VDAT, and the sensing circuit 140 may measure a current or a voltage of the pixel PX generated based on the sensing data voltage through the sensing line SL. In an embodiment, the sensing circuit 140 may be implemented as an integrated circuit separate from the integrated circuit in which the data driver 130 is implemented. In another embodiment, the sensing circuit 140 may be included in the data driver 130 or the timing controller 180.

The voltage generator 150 may generate a gate driving voltage VDG, the data driving voltage VDD, and a timing control voltage VDT based on an input voltage VIN. The voltage generator 150 may provide the gate driving voltage VDG to the level shifter 160, may provide the data driving voltage VDD to the data driver 130, and may provide the timing control voltage VDT to the timing controller 180.

The level shifter 160 may generate the gate clock signals CR_CLK, SC_CLK, and SS_CLK based on on-clock signals ON_CLK, off-clock signals OFF_CLK, gate enable signals OE, a start signal STV, and the gate driving voltage VDG, and may provide the gate clock signals CR_CLK, SC_CLK, and SS_CLK to the gate driver 120. In an embodiment, the on-clock signals ON_CLK may include a first on-clock signal, a second on-clock signal, and a third on-clock signal, and the off-clock signals OFF_CLK may include a first off-clock signal, a second off-clock signal, and a third off-clock signal. Hereinafter, the first on-clock signal, the second on-clock signal, and the third on-clock signal will be referred to as a carry on-clock signal, a scan on-clock signal, and a sensing on-clock signal, respectively, and the first off-clock signal, the second off clock signal, and the third off-clock signal will be referred to as a carry off-clock signal, a scan off-clock signal, and a sensing off-clock signal, respectively. In an embodiment, the gate enable signals OE may include a first gate enable signal, a second gate enable signal, and a third gate enable signal. Hereinafter, the first gate enable signal, the second gate enable signal, and the third gate enable signal will be referred to as a carry enable signal, a scan enable signal, and a sensing enable signal, respectively. The gate clock signals CR_CLK, SC_CLK, and SS_CLK may include first gate clock signals CR_CLK, second gate clock signals SC_CLK, and third gate clock signals SS_CLK. Hereinafter, the first gate clock signals CR_CLK, the second gate clock signals SC_CLK, and the third gate clock signals CS_CLK will be referred to as carry clock signals CR_CLK, scan clock signals SC_CLK, and sensing clock signals SS_CLK. The gate driving voltage VDG may include a gate-on voltage and a gate-off voltage. The gate clock signals CR_CLK, SC_CLK, and SS_CLK may have a voltage level of the gate-on voltage and a voltage level of the gate-off voltage.

The over-current detector 170 may detect an over-current by sensing clock currents CR_CLK_I, SC_CLK_I, and SS_CLK_I of the gate clock signals CR_CLK, SC_CLK, and SS_CLK at a time point when a rising edge and/or a falling edge of the on-clock signals ON_CLK is generated and/or at a time point when a rising edge and/or a falling edge of the off-clock signals OFF_CLK is generated, and may generate a shutdown signal SD in response to the over-current. The clock currents CR_CLK_I, SC_CLK_I, and SS_CLK_I may include first gate clock currents CR_CLK_I of the carry clock signals CR_CLK, second gate clock currents SC_CLK_I of the scan clock signals SC_CLK, and third gate clock currents SS_CLK_I of the sensing clock signals SS_CLK. Hereinafter, the first gate clock currents CR_CLK_I, the second gate clock currents SC_CLK_I, and the third gate clock currents SS_CLK_I will be referred to as carry clock currents CR_CLK_I, scan clock currents SC_CLK_I, and sensing clock currents SS_CLK_I, respectively. The voltage generator 150 may stop providing the gate driving voltage VDG, the data driving voltage VDD, and the timing control voltage VDT in response to the generated shutdown signal SD. When the supply of the gate driving voltage VDG is stopped, the level shifter 160 may not generate the gate clock signals CR_CLK, SC_CLK, and SS_CLK, and accordingly, the gate driver 120 may not generate the scan signals SC and the sensing signals SS.

The level shifter 160 and the over-current detector 170 may be implemented as a single integrated circuit ("IC"). FIG. 1 illustrates that the level shifter 160 and the over-current detector 170 are implemented independently of the timing controller 180, however, the present disclosure is not limited thereto, and the level shifter 160 and the over-current detector 170 may be implemented as a single IC together with the timing controller 180.

The timing controller 180 may control a driving of the data driver 130, a driving of the sensing circuit 140, a driving of the level shifter 160, and a driving of the over-current detector 170. The timing controller 180 may generate the output image data IMG2, the data control signal CTRD, the on-clock signals ON_CLK, the off-clock signals OFF_CLK, the gate enable signals OE, and the start signal STV based on input image data IMG1, a control signal CTR, and the timing control voltage VDT. The control signal CTR may include a vertical synchronization signal, a horizontal synchronization signal, a clock signal, or the like. The timing controller 180 may provide the output image data IMG2 and the data control signal CTRD to the data driver 130, may provide the on-clock signals ON_CLK, the off-clock signals OFF_CLK, the gate enable signals OE, and the start signal STV to the level shifter 160, and may provide the on-clock signals ON_CLK and the off-clock signals OFF_CLK to the over-current detector 170.

FIG. 1 illustrates that the timing controller 180 is implemented independently of the data driver 130, however, the present disclosure is not limited thereto. For example, the timing controller 180 may be implemented as a single IC together with the data driver 130.

Figure 2:
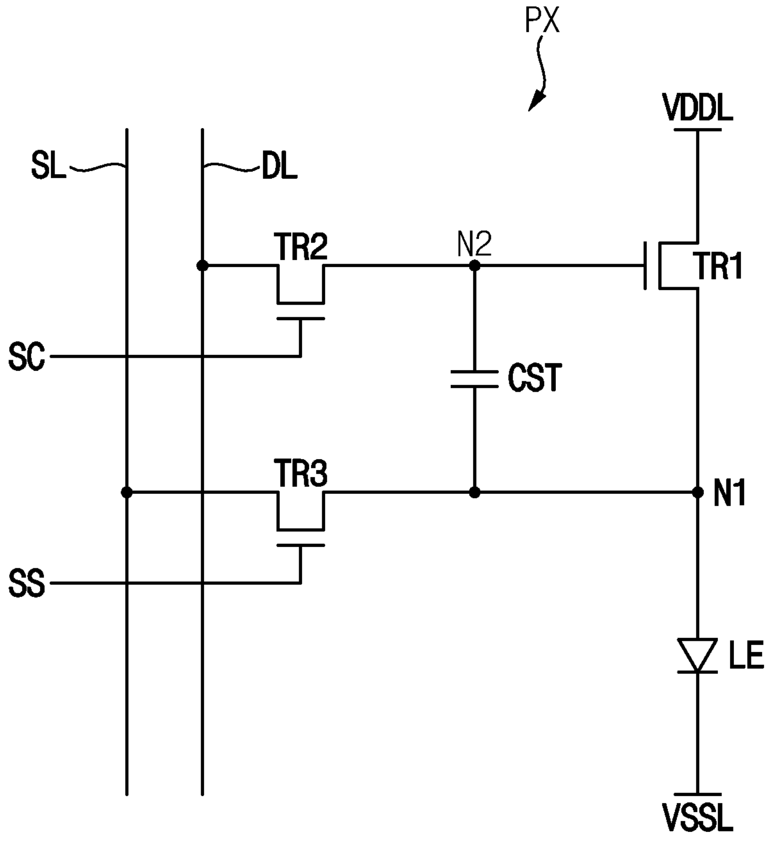
FIG. 2 is a circuit diagram illustrating a pixel included in the display device in FIG. 1.

FIG. 2 is a circuit diagram illustrating the pixel PX included in the display device 100 in FIG. 1.

Referring to FIGS. 1 and 2, the pixel PX may include a first transistor TR1, a second transistor TR2, a third transistor TR3, a storage capacitor CST, and a light emitting element LE.

The first transistor TR1 may provide a driving current to the light emitting element LE. A first electrode of the first transistor TR1 may be connected to a first power line VDDL that transmits a first power voltage, and a second electrode of the first transistor TR1 may be connected to a first node N1. A gate electrode of the first transistor TR1 may be connected to a second node N2.

The second transistor TR2 may be turned on in response to the scan signal SC to provide the data voltage VDAT to the second node N2. A first electrode of the second transistor TR2 may be connected to the data line DL, and a second electrode of the second transistor TR2 may be connected to the second node N2. A gate electrode of the second transistor TR2 may receive the scan signal SC.

The third transistor TR3 may be turned on in response to the sensing signal SS to connect the sensing line SL to the first node N1. A first electrode of the third transistor TR3 may be connected to the sensing line SL, and a second electrode of the third transistor TR3 may be connected to the first node N1. A gate electrode of the third transistor TR3 may receive the sensing signal SS.

The storage capacitor CST may maintain a voltage between the first node N1 and the second node N2. A first electrode of the storage capacitor CST may be connected to the first node N1 and a second electrode of the storage capacitor CST may be connected to the second node N2.

The light emitting element LE may emit light based on the driving current. A first electrode of the light emitting element LE may be connected to the first node N1, and a second electrode of the light emitting element LE may be connected to a second power line VSSL that transmits a second power voltage.

Figure 3:
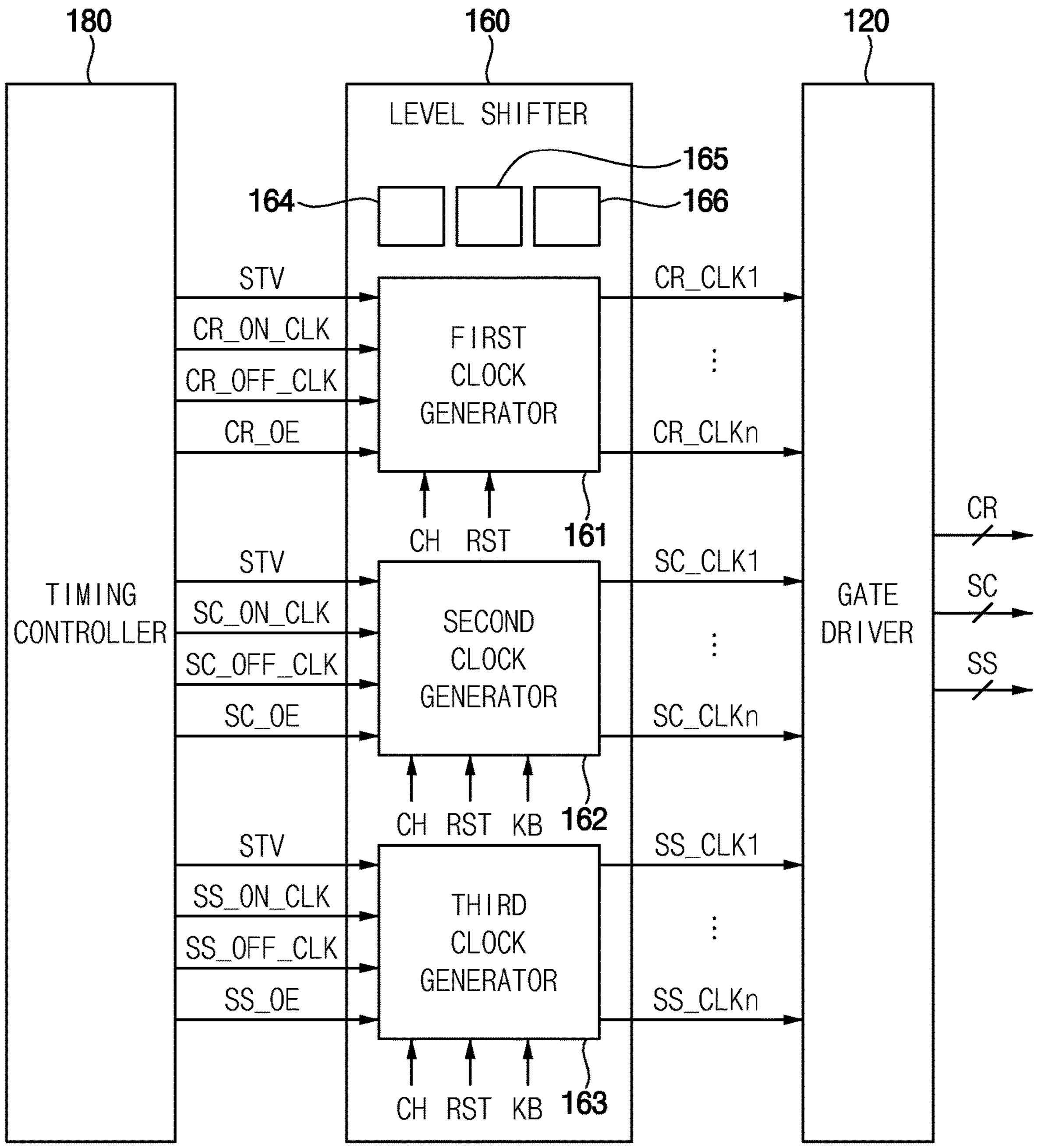
FIG. 3 is a block diagram illustrating a timing controller, a level shifter, and a gate driver included in the display device in FIG. 1.

FIG. 3 is a block diagram illustrating the timing controller 180, the level shifter 160, and the gate driver 120 included in the display device 100 in FIG. 1.

Referring to FIG. 3, the timing controller 180 may provide the start signal STV, the carry on-clock signal CR_ON_CLK, the carry off-clock signal CR_OFF_CLK, the carry enable signal CR_OE, the scan on-clock signal SC_ON_CLK, the scan off-clock signal SC_OFF_CLK, the scan enable signal SC_OE, the sensing on-clock signal SS_ON_CLK, the sensing off-clock signal SS_OFF_CLK, and the sensing enable signal SS_OE to the level shifter 160. The carry on-clock signal CR_ON_CLK and the carry off-clock signal CR_OFF_CLK may be signals necessary for generating first to $n^{th}$ (n is a natural number greater than or equal to 2) carry clock signals CR_CLK1-CR_CLKn, and may have a high voltage level and a low voltage level. The scan on-clock signal SC_ON_CLK and the scan off-clock signal SC_OFF_CLK may be signals necessary for generating first to $n^{th}$ scan clock signals SC_CLK1-SC_CLKn, and may have a high voltage level and a low voltage level. The sensing on-clock signal SS_ON_CLK and the sensing off-clock signal SS_OFF_CLK may be signals necessary for generating first to $n^{th}$ sensing clock signals SS_CLK1-SS_CLKn, and may have a high voltage level and a low voltage level.

The level shifter 160 may include a first clock generator 161, a second clock generator 162, and a third clock generator 163. FIG. 3 illustrates that the level shifter 160 includes three clock generators, however, the present disclosure is not limited thereto, and the level shifter 160 may include one, two, or four or more clock generators. Hereinafter, the first clock generator 161, the second clock generator 162, and the third clock generator 163 will be referred to as a carry clock generator 161, a scan clock generator 162, and a sensing clock generator 163, respectively.

The carry clock generator 161 may generate the carry clock signals CR_CLK1-CR_CLKn based on the start signal STV, the carry on-clock signal CR_ON_CLK, the carry off-clock signal CR_OFF_CLK, the carry enable signal CR_OE, a channel signal CH, and a reset signal RST. The carry clock signals CR_CLK1-CR_CLKn may be signals necessary for generating carry signals CR and may have the voltage level of the gate-on voltage and the voltage level of the gate-off voltage periodically.

The scan clock generator 162 may generate the scan clock signals SC_CLK1-SC_CLKn based on the start signal STV, the scan on-clock signal SC_ON_CLK, the scan off-clock signal SC_OFF_CLK, the scan enable signal SC_OE, the channel signal CH, the reset signal RST, and a kickback signal KB. The scan clock signals SC_CLK1-SC_CLKn may be signals necessary for generating the scan signals SC and may have the voltage level of the gate-on voltage and the voltage level of the gate-off voltage.

The sensing clock generator 163 may generate the sensing clock signals SS_CLK1-SS_CLKn based on the start signal STV, the sensing on-clock signal SS_ON_CLK, the sensing off-clock signal SS_OFF_CLK, the sensing enable signal SS_OE, the channel signal CH, the reset signal RST, and the kickback signal KB. The sensing clock signals SS_CLK1-SS_CLKn may be signals necessary for generating the sensing signals SS and may have the voltage level of the gate-on voltage and the voltage level of the gate-off voltage.

The level shifter 160 may further include a channel register 164, a reset register 165, and a kickback register 166.

The channel register 164 may store information indicating a channel mode regarding the number of channels. In an embodiment, the information stored in the channel register 164 may indicate a 2-channel mode in which the number of each of the carry clock signals CR_CLK1 and CR_CLK2, the scan clock signals SC_CLK1 and SC_CLK2, and the sensing clock signals SS_CLK1 and SS_CLK2 is two, a 3-channel mode in which the number of each of the carry clock signals CR_CLK1-CR_CLK3, the scan clock signals SC_CLK1-SC_CLK3, and the sensing clock signals SS_CLK1-SS_CLK3 is three, a 4-channel mode in which the number of each of the carry clock signals CR_CLK1-CR_CLK4, the scan clock signals SC_CLK1-SC_CLK4, and the sensing clock signals SS_CLK1-SS_CLK4 is four, a 5-channel mode in which the number of each of the carry clock signals CR_CLK1-CR_CLK5, the scan clock signals SC_CLK1-SC_CLK5, and the sensing clock signals SS_CLK1-SS_CLK5 is five, a 6-channel mode in which the number of each of the carry clock signals CR_CLK1-CR_CLK6, the scan clock signals SC_CLK1-SC_CLK6, and the sensing clock signals SS_CLK1-SS_CLK6 is six, a 7-channel mode in which the number of each of the carry clock signals CR_CLK1-CR_CLK7, the scan clock signals SC_CLK1-SC_CLK7, and the sensing clock signals SS_CLK1-SS_CLK7 is seven, and an 8-channel mode in which the number of each of the carry clock signals CR_CLK1-CR_CLK8, the scan clock signals SC_CLK1-SC_CLK8, and the sensing clock signals SS_CLK1-SS_CLK8 is eight. In other words, the number of the channels may be a natural number of 2 to 8. In an embodiment, when the display device 10 is powered on, the information indicating the channel mode may be written in the channel register 164, the channel signal CH corresponding to the channel mode may be generated, and the level shifter 160 may generate the number of the carry clock signals CR_CLK1-CR_CLKn, the scan clock signals SC_CLK1-SC_CLKn, and the sensing clock signals SS_CLK1-SS_CLKn corresponding to a preset number of channels included in the channel signal CH.

The reset register 165 may store information indicating a reset mode regarding whether to reset. In an embodiment, the information stored in the reset register 165 may indicate a reset-off mode in which the carry clock signals CR_CLK1-

CR_CLKn, the scan clock signals SC_CLK1-SC_CLKn, and the sensing clock signals SS_CLK1-SS_CLKn are generated irrespective of the start signal STV and a reset-on mode in which the carry clock signals CR_CLK1-CR-_CLKn, the scan clock signals SC_CLK1-SC_CLKn, and the sensing clock signals SS_CLK1-SS_CLKn are reset in response to the start signal STV. In an embodiment, when the display device 10 is powered on, the information indicating the reset mode may be written in the reset register 165, the reset signal RST corresponding to the reset mode may be generated, and the level shifter 160 may generate the carry clock signals CR_CLK1-CR_CLKn, the scan clock signals SC_CLK1-SC_CLKn, and the sensing clock signals SS_CLK1-SS_CLKn which corresponds to the reset signal RST.

The kickback register 166 may store information indicating a kickback mode regarding whether a kickback is compensated. In an embodiment, the information stored in the kickback register 166 may indicate a kickback-off mode in which the scan clock signals SC_CLK1-SC_CLKn and the sensing clock signals SS_CLK1-SS_CLKn which do not compensate a kickback phenomenon that may occur in the pixel PX are generated and a kickback-on mode in which the scan clock signals SC_CLK1-SC_CLKn and the sensing clock signals SS_CLK1-SS_CLKn for compensating the kickback phenomenon are generated. In an embodiment, when the display device 10 is powered on, the information indicating the kickback mode may be written in the kickback register 166, the kickback signal KB corresponding to the kickback mode may be generated, and the level shifter 160 may generate the scan clock signals SC_CLK1-SC_CLKn and the sensing clock signals SS_CLK1-SS_CLKn which corresponds to the kickback signal KB.

Figure 4:
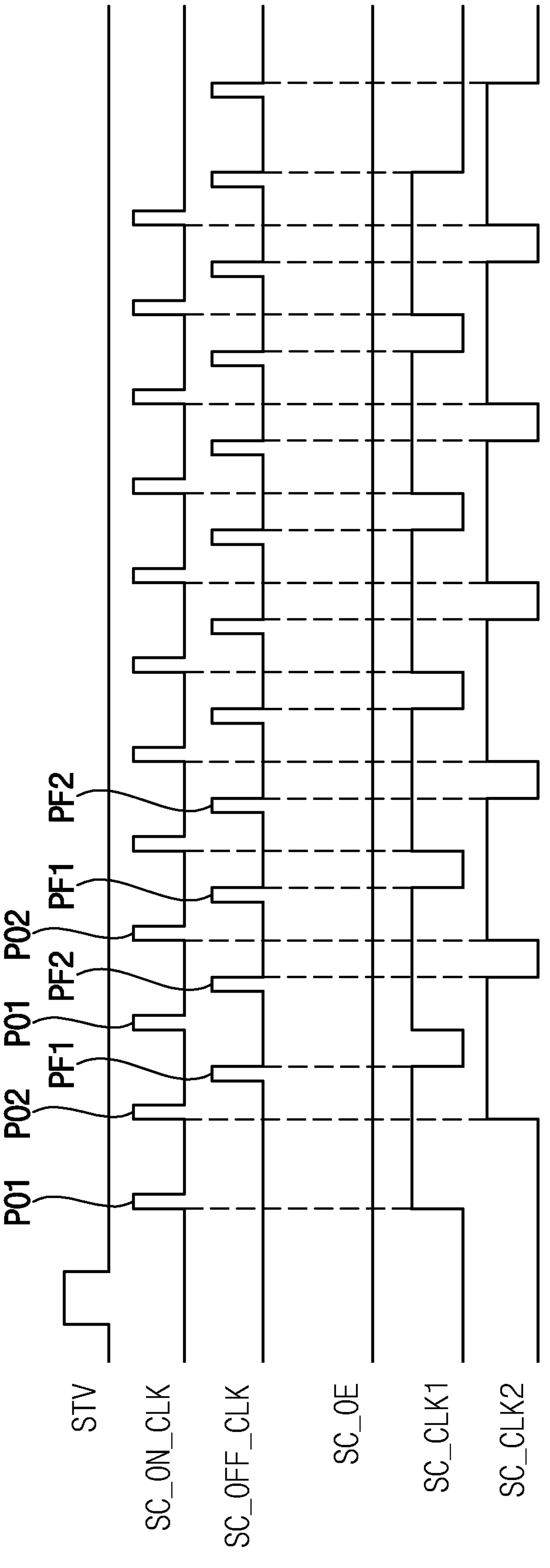
FIGS. 4, 5, 6 and 7 are timing diagrams for describing an example of an operation of the level shifter in FIG. 3.
Figure 5:
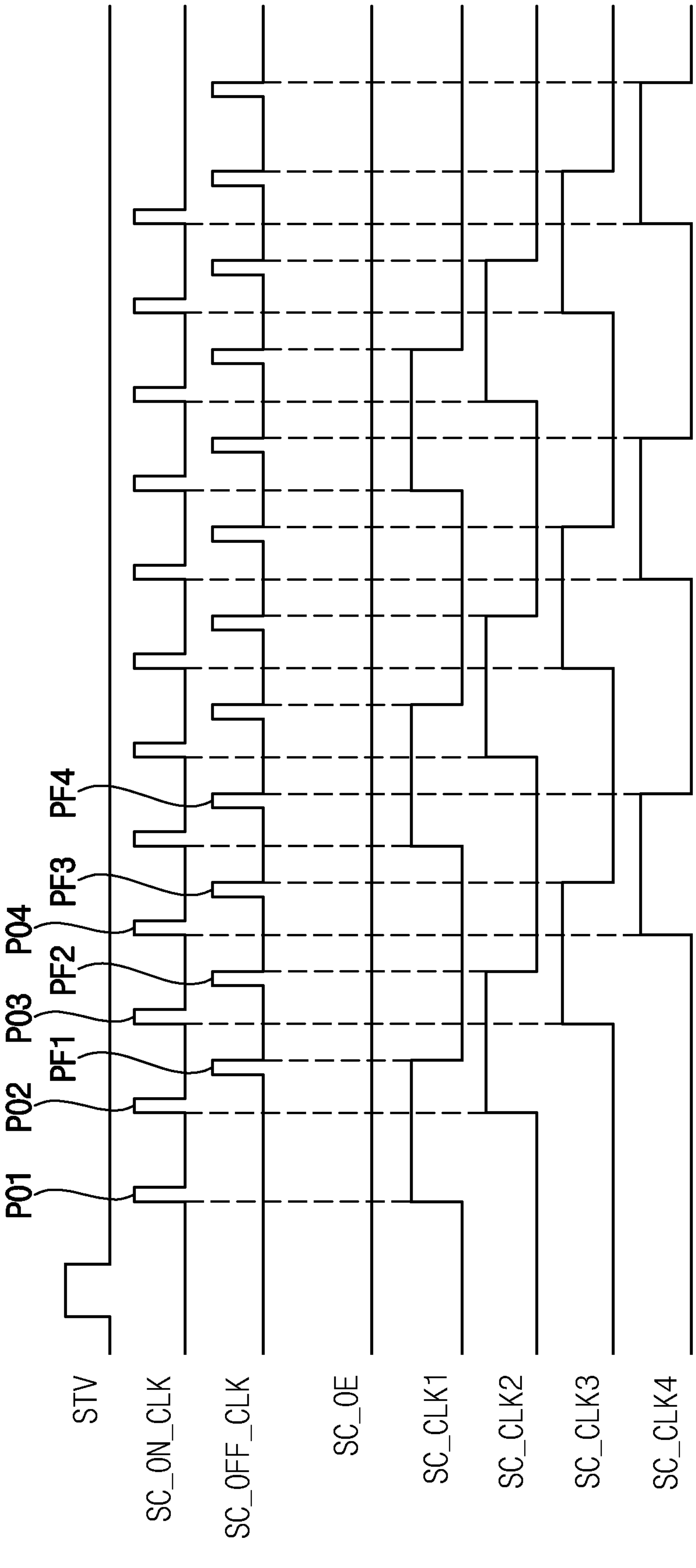
Figure 6:
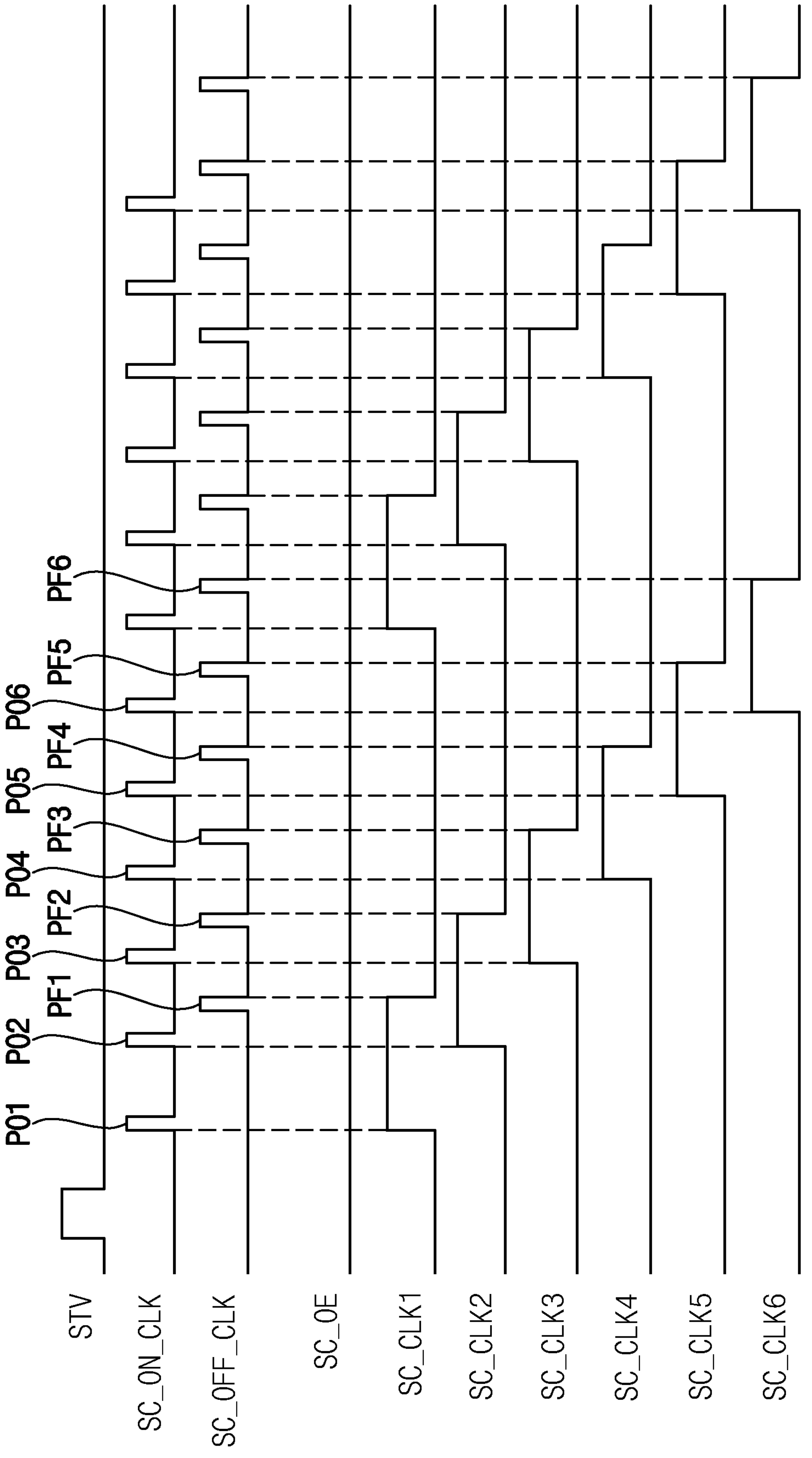

FIGS. 4 to 7 are timing diagrams for describing an example of an operation of the level shifter 160 in FIG. 3. FIG. 4 may illustrate the scan clock signals SC_CLK1 and SC_CLK2 in the 2-channel mode and the kickback-off mode, and FIG. 5 may illustrate the scan clock signals SC_CLK1-SC_CLK4 in the 4-channel mode and the kickback-off mode. FIG. 6 may illustrate the scan clock signals SC_CLK1-SC_CLK6 in the 6-channel mode and the kickback-off mode, and FIG. 7 may illustrate the scan clock signals SC_CLK1-SC_CLK8 in the 8-channel mode and the kickback-off mode.

Referring to FIG. 4, after a pulse of the start signal STV is generated, a pulse of each of the scan on-clock signal SC_ON_CLK and the scan off-clock signal SC_OFF_CLK may be generated. In other words, the start signal STV may define the start of the operation of the level shifter 160.

Each of the scan on-clock signal SC_ON_CLK and the scan off-clock signal SC_OFF_CLK may include a plurality of pulses having a preset period. A period of the scan off-clock signal SC_OFF_CLK may be substantially equal to a period of the scan on-clock signal SC_ON_CLK. In an embodiment, the scan off-clock signal SC_OFF_CLK may have a waveform in which the scan on-clock signal SC_ON-_CLK is shifted by a predetermined time.

The level shifter 160 may generate a first scan clock signal SC_CLK1 and a second scan clock signal SC_CLK2 in the 2-channel mode. The second scan clock signal SC_CLK2 may have a waveform in which the first scan clock signal SC_CLK1 is shifted by a predetermined time.

The level shifter 160 may generate a rising edge of the first scan clock signal SC_CLK1 synchronized with a rising edge of a first pulse PO1 (an odd-numbered pulse) of the scan on-clock signal SC_ON_CLK, and may generate a falling edge of the first scan clock signal SC_CLK1 synchronized with a falling edge of a first pulse PF1 (an odd-numbered pulse) of the scan off-clock signal SC_OFF_CLK. Accordingly, the first scan clock signal SC_CLK1 may have a pulse with a high voltage level which is synchronized with the rising edge of the first pulse PO1 of the scan on-clock signal SC_ON_CLK and the falling edge of the first pulse PF1 of the scan off-clock signal SC_OFF_CLK.

Similar to the first scan clock signal SC_CLK1, the level shifter 160 may generate a rising edge of the second scan clock signal SC_CLK2 synchronized with a rising edge of a second pulse PO2 (an even-numbered pulse) of the scan on-clock signal SC_ON_CLK, and may generate a falling edge of the second scan clock signal SC_CLK2 synchronized with a falling edge of a second pulse PF2 (an even-numbered pulse) of the scan off-clock signal SC_OFF_CLK. Accordingly, the second scan clock signal SC_CLK2 may have a waveform in which the first scan clock signal SC_CLK1 is shifted by one period of the scan on-clock signal SC_ON_CLK.

Referring to FIG. 5, the level shifter 160 may generate first to fourth scan clock signals SC_CLK1-SC_CLK4 in the 4-channel mode. An $m^{th}$ scan clock signal SC_CLKm (m is a natural number of 2 to 4) may have a waveform in which an $m-1^{th}$ scan clock signal SC_CLKm−1 is shifted by a predetermined time.

The level shifter 160 may generate a rising edge of the first scan clock signal SC_CLK1 synchronized with the rising edge of the first pulse PO1 (a $4k-3^{th}$ pulse (k is a natural number greater than or equal to 1)) of the scan on-clock signal SC_ON_CLK, and may generate a falling edge of the first scan clock signal SC_CLK1 synchronized with the falling edge of the first pulse PF1 ($4k-3^{th}$ pulse) of the scan off-clock signal SC_OFF_CLK. Accordingly, the first scan clock signal SC_CLK1 may have a pulse with a high voltage level which is synchronized with the rising edge of the first pulse PO1 of the scan on-clock signal SC_ON_CLK and the falling edge of the first pulse PF1 of the scan off-clock signal SC_OFF_CLK.

Similar to the first scan clock signal SC_CLK1, the level shifter 160 may generate a rising edge of the second scan clock signal SC_CLK2 synchronized with the rising edge of the second pulse PO2 ($4k-2^{th}$ pulse) of the scan on-clock signal SC_ON_CLK, and may generate a falling edge of the second scan clock signal SC_CLK2 synchronized with the falling edge of the second pulse PF2 ($4k-2^{th}$ pulse) of the scan off-clock signal SC_OFF_CLK. Accordingly, the second scan clock signal SC_CLK2 may have a waveform in which the first scan clock signal SC_CLK1 is shifted by one period of the scan on-clock signal SC_ON_CLK.

The third and fourth scan clock signals SC_CLK3 and SC_CLK4 illustrated in FIG. 5 may also be generated similarly to the first and second scan clock signals SC_CLK1 and SC_CLK2.

Referring to FIG. 6, the level shifter 160 may generate first to sixth scan clock signals SC_CLK1-SC_CLK6 in the 6-channel mode. An mi scan clock signal SC_CLKm (m is a natural number of 2 to 6) may have a waveform in which an $m-1^{th}$ scan clock signal SC_CLKm−1 is shifted by a predetermined time.

The level shifter 160 may generate a rising edge of the first scan clock signal SC_CLK1 synchronized with the rising edge of the first pulse PO1 (a $6k-5^{th}$ pulse (k is a natural number greater than or equal to 1)) of the scan on-clock signal SC_ON_CLK, and may generate a falling edge of the first scan clock signal SC_CLK1 synchronized with the falling edge of the first pulse PF1 ($6k-5^{th}$ pulse) of the scan off-clock signal SC_OFF_CLK. Accordingly, the first scan clock signal SC_CLK1 may have a pulse with a high voltage level which is synchronized with the rising edge of the first pulse PO1 of the scan on-clock signal SC_ON_CLK and the falling edge of the first pulse PF1 of the scan off-clock signal SC_OFF_CLK.

Similar to the first scan clock signal SC_CLK1, the level shifter 160 may generate a rising edge of the second scan clock signal SC_CLK2 synchronized with the rising edge of the second pulse PO2 (6k−4$^{th}$ pulse) of the scan on-clock signal SC_ON_CLK, and may generate a falling edge of the second scan clock signal SC_CLK2 synchronized with the falling edge of the second pulse PF2 (6k−4$^{th}$ pulse) of the scan off-clock signal SC_OFF_CLK. Accordingly, the second scan clock signal SC_CLK2 may have a waveform in which the first scan clock signal SC_CLK1 is shifted by one period of the scan on-clock signal SC_ON_CLK.

The third to sixth scan clock signals SC_CLK3-SC_CLK6 illustrated in FIG. 6 may also be generated similarly to the first and second scan clock signals SC_CLK1 and SC_CLK2.

Figure 7:
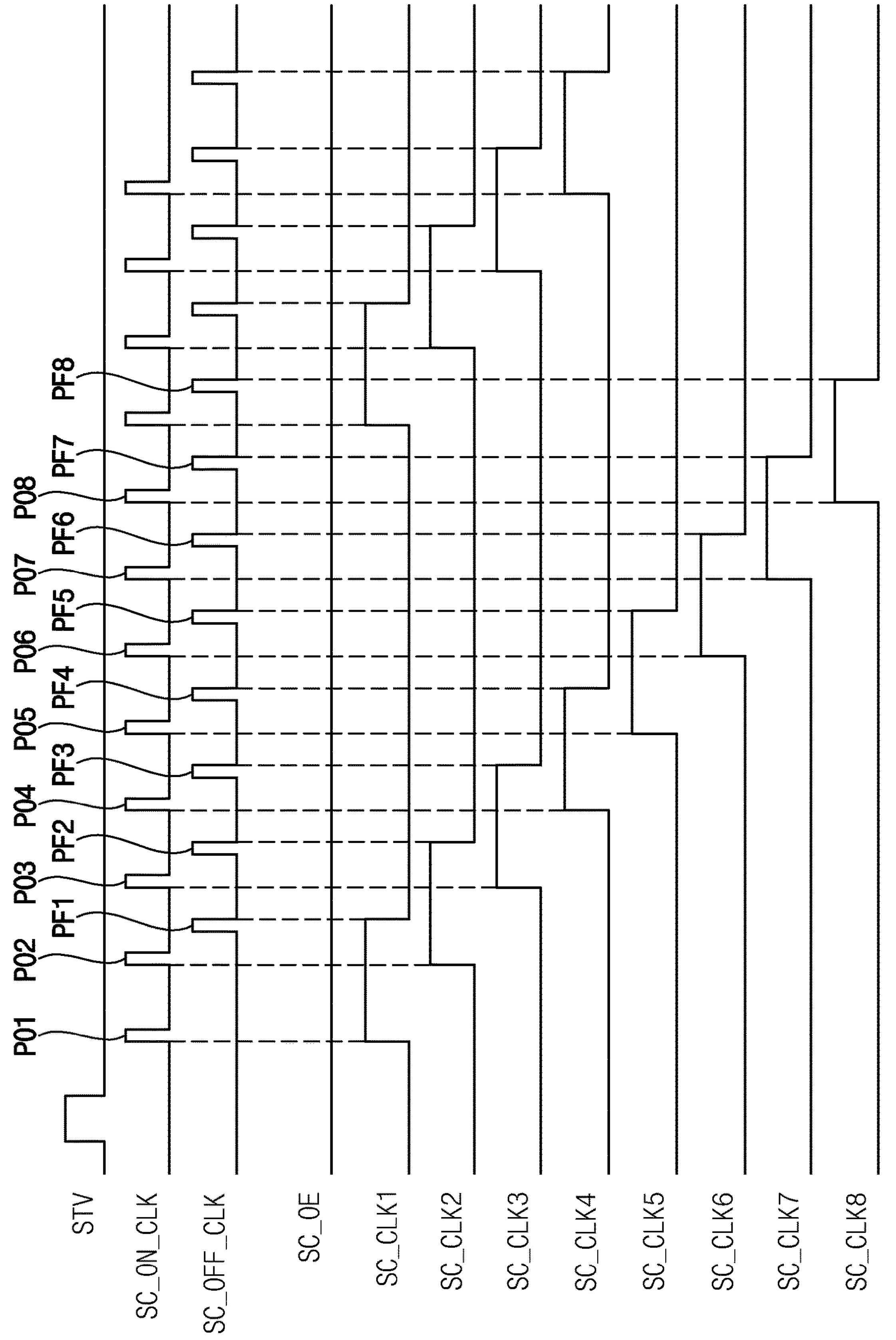

Referring to FIG. 7, the level shifter 160 may generate first to eighth scan clock signals SC_CLK1-SC_CLK8 in the 8-channel mode. An mi scan clock signal SC_CLKm (m is a natural number of 2 to 8) may have a waveform in which an m−1$^{th}$ scan clock signal SC_CLKm−1 is shifted by a predetermined time.

The level shifter 160 may generate a rising edge of the first scan clock signal SC_CLK1 synchronized with the rising edge of the first pulse PO1 (a 8k−7$^{th}$ pulse (k is a natural number greater than or equal to 1)) of the scan on-clock signal SC_ON_CLK, and may generate a falling edge of the first scan clock signal SC_CLK1 synchronized with the falling edge of the first pulse PF1 (8k−7$^{th}$ pulse) of the scan off-clock signal SC_OFF_CLK. Accordingly, the first scan clock signal SC_CLK1 may have a pulse with a high voltage level which is synchronized with the rising edge of the first pulse PO1 of the scan on-clock signal SC_ON_CLK and the falling edge of the first pulse PF1 of the scan off-clock signal SC_OFF_CLK.

Similar to the first scan clock signal SC_CLK1, the level shifter 160 may generate a rising edge of the second scan clock signal SC_CLK2 synchronized with the rising edge of the second pulse PO2 (8k−6$^{th}$ pulse) of the scan on-clock signal SC_ON_CLK, and may generate a falling edge of the second scan clock signal SC_CLK2 synchronized with the falling edge of the second pulse PF2 (8k−6$^{th}$ pulse) of the scan off-clock signal SC_OFF_CLK. Accordingly, the second scan clock signal SC_CLK2 may have a waveform in which the first scan clock signal SC_CLK1 is shifted by one period of the scan on-clock signal SC_ON_CLK.

The third to eighth scan clock signals SC_CLK3-SC_CLK8 illustrated in FIG. 7 may also be generated similarly to the first and second scan clock signals SC_CLK1 and SC_CLK2.

The level shifter 160 may generate the carry clock signals CR_CLK1-CR_CLKn and the sensing clock signals SS_CLK1-SS_CLKn similarly to the scan clock signals SC_CLK1-SC_CLKn described with reference to FIGS. 4 to 7.

In the embodiments described with reference to FIGS. 4 to 7, the level shifter 160 may sequentially generate a plurality of carry/scan/sensing clock signals CR_CLK1-CR_CLKn/SC_CLK1-SC_CLKn/SS_CLK1-SS_CLKn based on two input signals (the carry/scan/sensing on-clock signal CR_ON_CLK/SC_ON_CLK/SS_ON_CLK and the carry/scan/sensing off-clock signal CR_OFF_CLK/SC_OFF_CLK/SS_OFF_CLK), so that the number of the input signals of the level shifter 160 may decrease.

Figure 8:
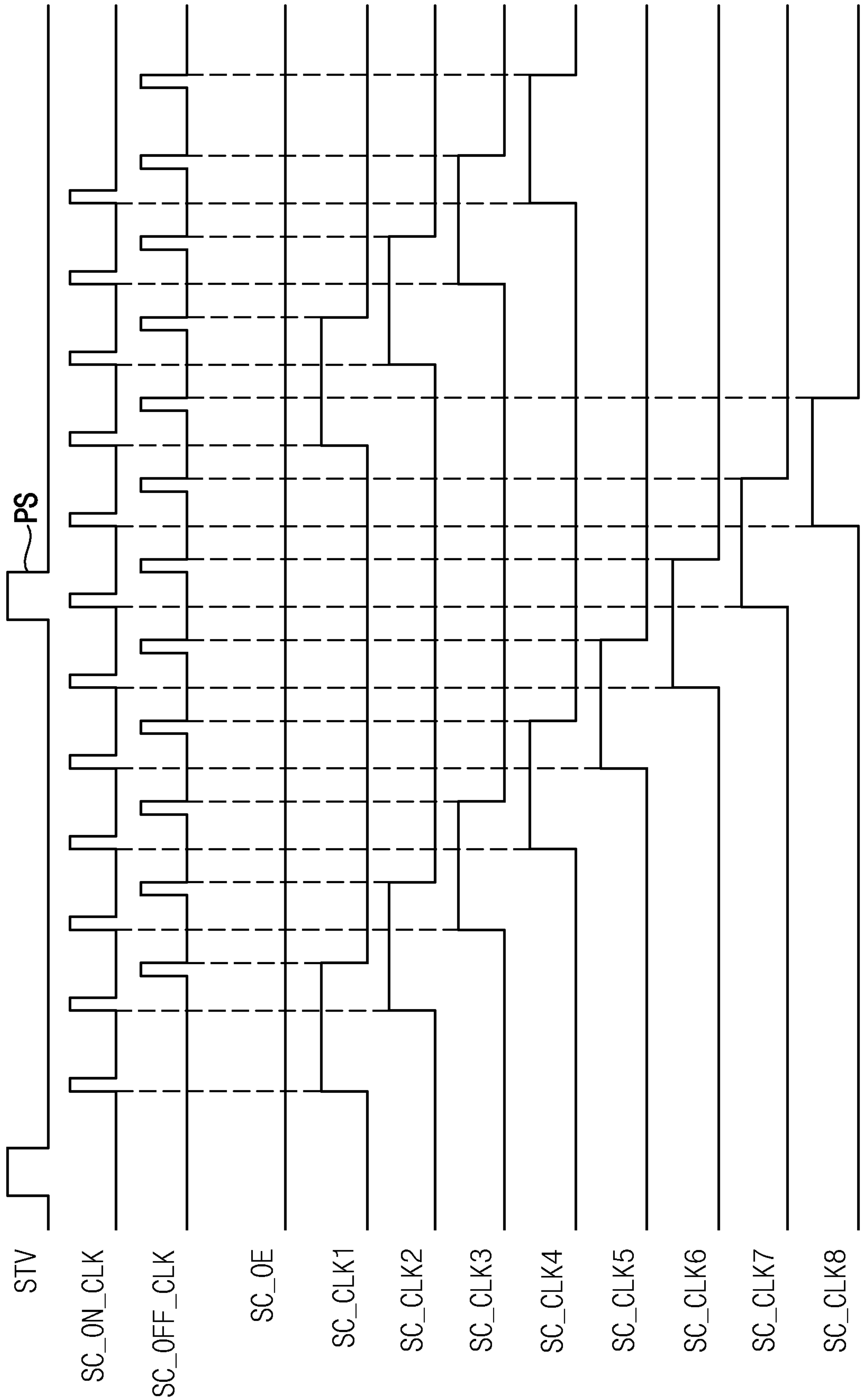
FIGS. 8 and 9 are timing diagrams for describing an example of an operation of the level shifter in FIG. 3.
Figure 9:
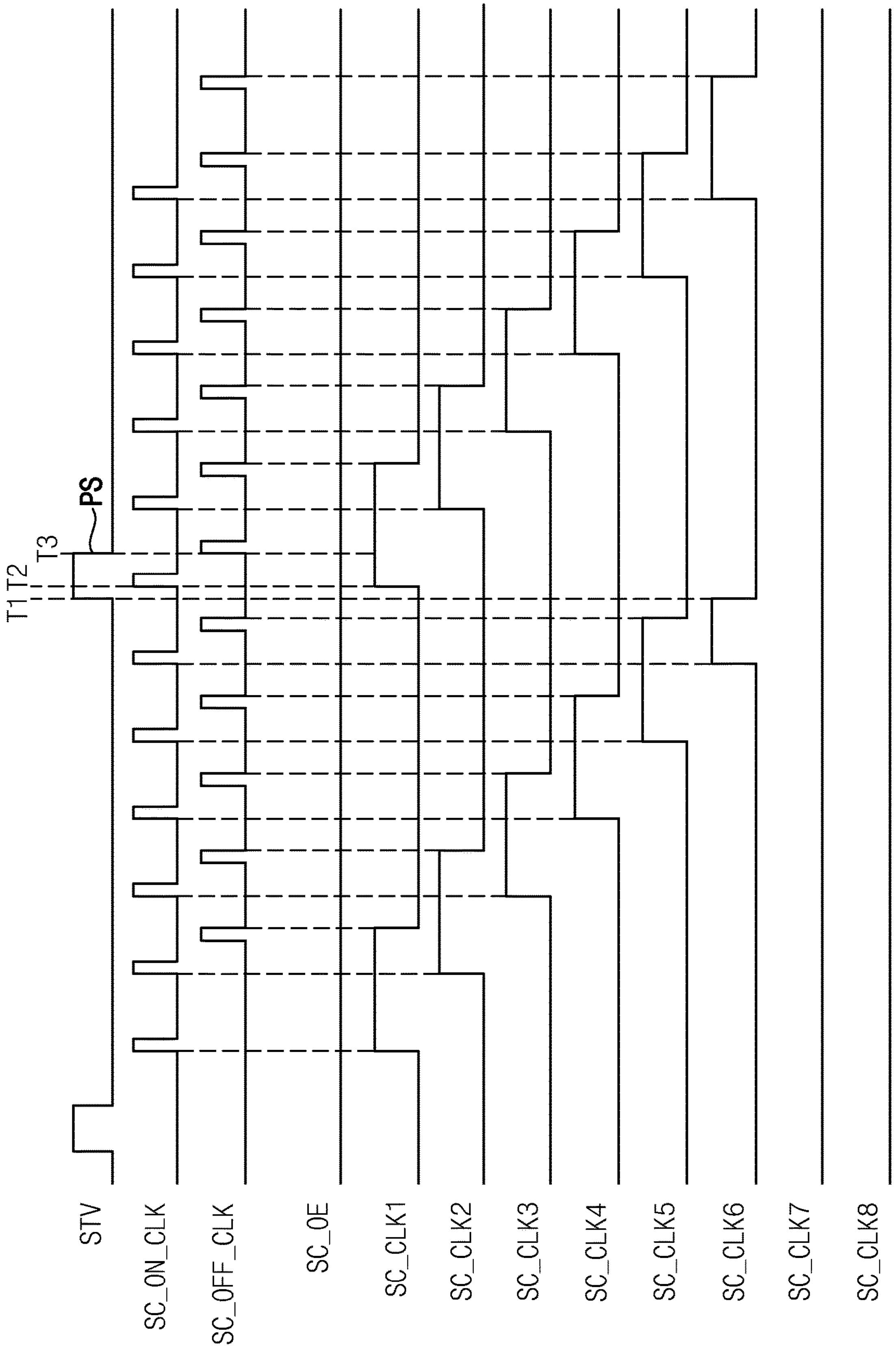

FIGS. 8 and 9 are timing diagrams for describing an example of an operation of the level shifter 160 in FIG. 3. FIG. 8 may illustrate the scan clock signals SC_CLK1-SC_CLK8 in the 8-channel mode, the reset-off mode, and the kickback-off mode, and FIG. 9 may illustrate the scan clock signals SC_CLK1-SC_CLK8 in the 8-channel mode, the reset-on mode, and the kickback-off mode.

Referring to FIG. 8, in the reset-off mode, the level shifter 160 may generate the scan clock signals SC_CLK1-SC-_CLKn regardless of the pulse PS of the start signal STV.

Referring to FIG. 9, in the reset-on mode, the level shifter 160 may sequentially generate the first to n$^{th}$ scan clock signals SC_CLK1-SC_CLKn in response to the pulse PS of the start signal STV. In other words, in the reset-on mode, when the pulse PS of the start signal STV appears, the level shifter 160 may stop generating the scan clock signals SC_CLK1-SC_CLKn, and may sequentially generate the scan clock signals SC_CLK1-SC_CLKn from the first scan clock signal SC_CLK1 in response to the pulse PS of the start signal STV.

In an embodiment, a time point T2 when the rising edge of the first scan clock signal SC_CLK1 is generated after the pulse PS of the start signal STV appears may be between a time point T1 when a rising edge of the pulse PS of the start signal STV is generated and a time point T3 when a falling edge of the pulse PS of the start signal STV is generated. Such an embodiment, the falling edge of the sixth scan clock signal SC_CLK6 in FIG. 9 is synchronized with a rising edge of the pulse PS of the start signal STV which is a time point T1.

The level shifter 160 may generate the carry clock signals CR_CLK1-CR_CLKn and the sensing clock signals SS_CLK1-SS_CLKn similarly to the scan clock signals SC_CLK1-SC_CLKn described with reference to FIGS. 8 and 9.

Figure 10:
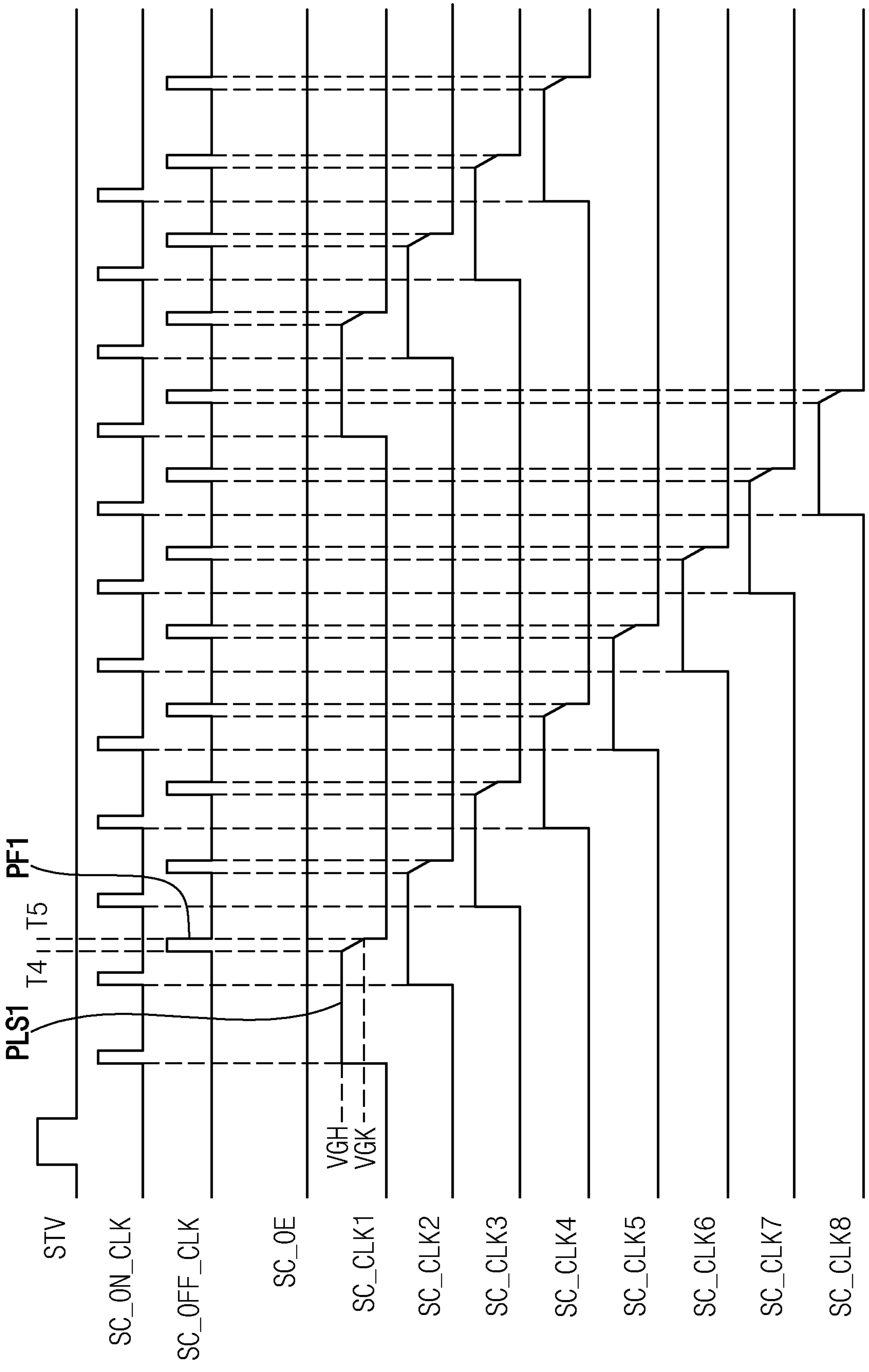
FIG. 10 is a timing diagram for describing an example of an operation of the level shifter in FIG. 3.

FIG. 10 is a timing diagram for describing an example of an operation of the level shifter 160 in FIG. 3. FIG. 10 may illustrate the scan clock signals SC_CLK1-SC_SLK8 in the 8-channel mode and the kickback-on mode.

Referring to FIG. 10, in the kickback-on mode, the level shifter 160 may gradually decrease a pulse included in each of the clock signals SC_CLK1-SC_SLKn from a first voltage level VGH to a second voltage level VGK lower than the first voltage level VGH from a time point when the rising edge of the scan off-clock signal SC_OFF_CLK is generated to a time point when the falling edge of the scan off-clock signal SC_OFF_CLK is generated.

In the kickback-on mode, the level shifter 160 may gradually decrease a first pulse PLS of the first clock signal SC_CLK1 from the first voltage level VGH to the second voltage level VGK based on the rising edge and the falling edge of the first pulse PF1 of the scan off-clock signal SC_OFF_CLK from a time point T4 when the rising edge of the first pulse PF1 of the scan off-clock signal SC_OFF_CLK is generated to a time point T5 when the falling edge of the first pulse PF1 of the scan off-clock signal SC_OFF_CLK is generated. Further, the first scan clock signal SC_CLK1 may have pulses having the same shape as the first pulse PLS1.

The second to eighth scan clock signals SC_CLK2-SC_CLK8 illustrated in FIG. 10 may also be generated similarly to the first scan clock signal SC_CLK1.

The level shifter 160 may generate the sensing clock signals SS_CLK1-SS_CLKn similarly to the scan clock signals SC_CLK1-SC_CLKn described with reference to FIG. 10.

Figure 11:
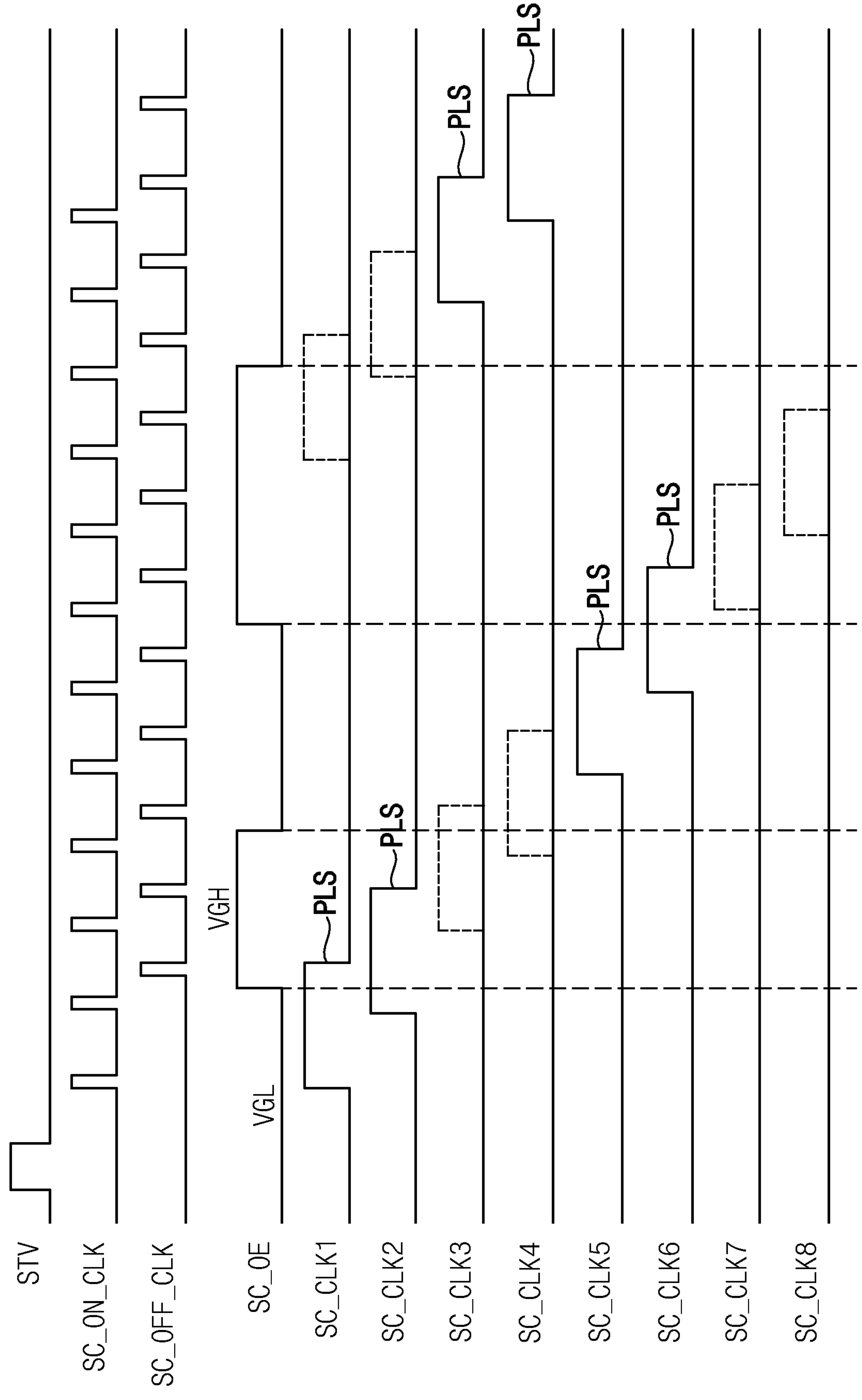
FIG. 11 is a timing diagram for describing an example of an operation of the level shifter in FIG. 3.

FIG. 11 is a timing diagram for describing an example of an operation of the level shifter 160 in FIG. 3. FIG. 11 may illustrate the scan clock signals SC_CLK1-SC_CLK8 in the 8-channel mode and the kickback-off mode.

Referring to FIG. 11, the level shifter 160 may generate a scan clock signal including the pulse PLS having the rising edge and the falling edge respectively synchronized with the rising edge of the scan on-clock signal SC_ON_CLK and the falling edge of the scan off-clock signal SC_OFF_CLK when the scan enable signal SC_OE has a first voltage level VGL at the time point of the rising edge of the scan on-clock signal SC_ON_CLK. Further, the level shifter 160 may generate a scan clock signal that does not include the pulse PLS when the scan enable signal SC_OE has a second voltage level VGH that is different from the first voltage level VGL at the time point of the rising edge of the scan on-clock signal SC_ON_CLK. In an embodiment, the second voltage level VGH may be higher than the first voltage level VGL.

The pulse PLS of the scan clock signal in which a time point when the rising edge of the scan on-clock signal SC_ON_CLK is generated overlaps the second voltage level VGH of the scan enable signal SC_OE may not be output. In other words, when the time point when the rising edge of the pulse PLS is generated overlaps the second voltage level VGH of the scan enable signal SC_OE, the scan clock signal may have a low voltage level in a period in which the pulse PLS is output. For example, when the scan enable signal SC_OE illustrated in FIG. 11 is provided to the level shifter 160, a first pulse of the third scan clock signal SC_CLK3, a first pulse of the fourth scan clock signal SC_CLK4, a first pulse of the seventh scan clock signal SC_CLK7, a first pulse of the eighth scan clock signal SC_CLK8, a second pulse of the first scan clock signal SC_CLK1, and a second pulse of the second scan clock signal SC_CLK2, in which the time point when the rising edge is generated overlaps the second voltage level VGH of the scan enable signal SC_OE, may not be output.

The pulse PLS of the scan clock signal in which a time point when the falling edge is generated overlaps the second voltage level VGH of the scan enable signal SC_OE may be output. In other words, when the time point when the falling edge of the pulse PLS is generated overlaps the second voltage level VGH of the scan enable signal SC_OE, the scan clock signal may have a high voltage in a period in which the pulse PLS is output. For example, when the scan enable signal SC_OE illustrated in FIG. 11 is provided to the level shifter 160, a first pulse of the first scan clock signal SC_CLK1, a first pulse of the second scan clock signal SC_CLK2, and a first pulse of the sixth scan clock signal SC_CLK6, in which the time point when the falling edge is generated overlaps the second voltage level VGH of the scan enable signal SC_OE, may be output. When the scan enable signal SC_OE having the high level does not overlap time points when the falling edge and the rising edge, a first pulse of the third scan clock signal SC_CLK3, a first pulse of the fourth scan clock signal SC_CLK4, and a first pulse of the fifth scan clock signal SC_CLK5, is generated.

The level shifter 160 may generate the carry clock signals CR_CLK1-CR_CLKn and the sensing clock signals SS_CLK1-SS_CLKn similarly to the scan clock signals SC_CLK1-SC_CLKn described with reference to FIG. 11.

Figure 12:
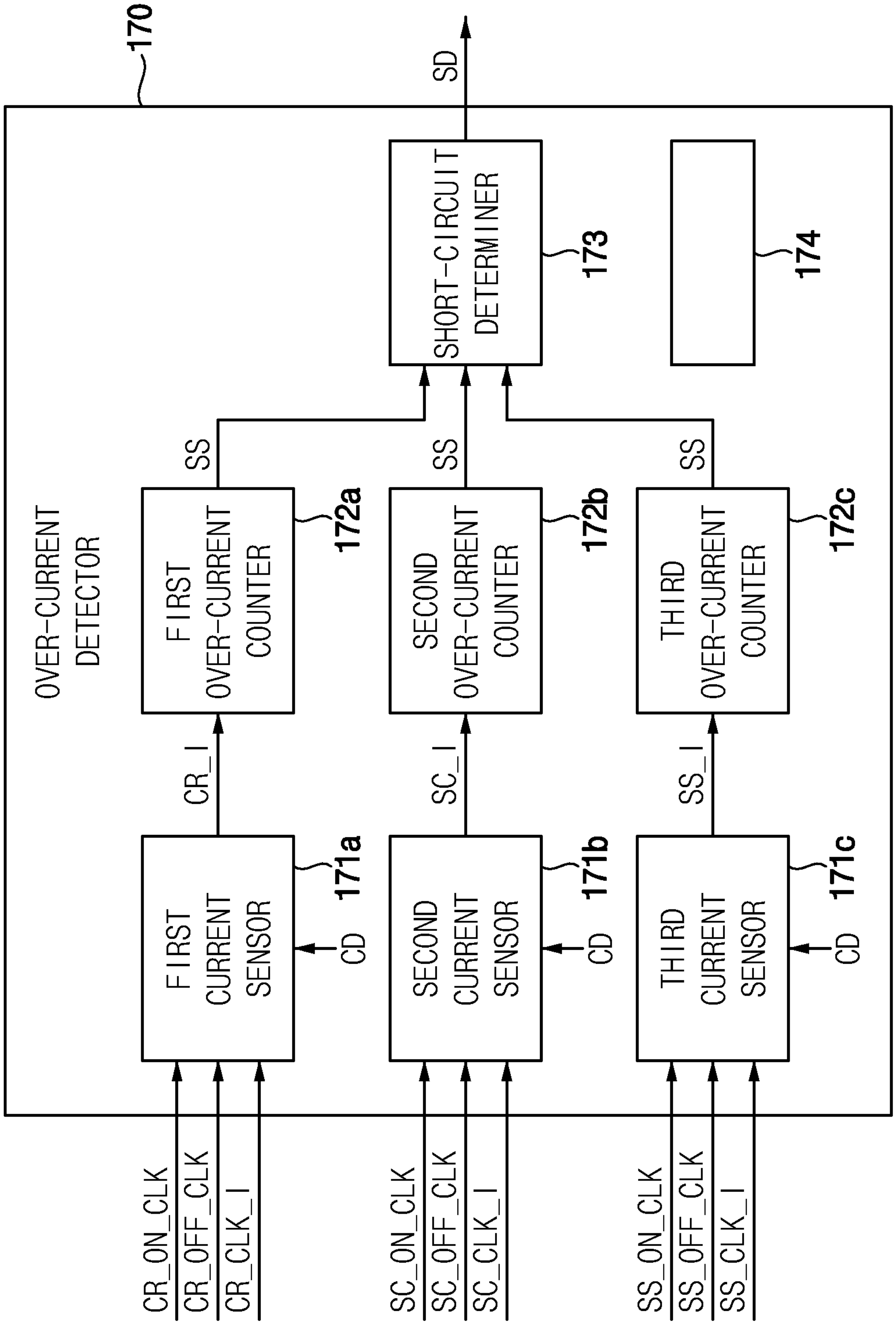
FIG. 12 is a block diagram illustrating an over-current detector included in the display device in FIG. 1.

FIG. 12 is a block diagram illustrating the over-current detector 170 included in the display device 100 in FIG. 1.

Referring to FIG. 12, the over-current detector 170 may include a first current sensor 171*a*, a second current sensor 171*b*, a third current sensor 171*c*, a first over-current counter 172*a*, a second over-current counter 172*b*, a third over-current counter 172*c*, and a short-circuit determiner 173. FIG. 12 illustrates that the over-current detector 170 includes three current sensors and three over-current counters, however, the present disclosure is not limited thereto, and the over-current detector 170 may include one, two, or four or more current sensors and over-current counters. Hereinafter, the first current sensor 171*a*, the second current sensor 171*b*, and the third current sensor 171*c* will be referred to as a carry current sensor 171*a*, a scan current sensor 171*b*, and a sensing current sensor 171*c*, respectively, and the first over-current counter 172*a*, the second over-current counter 172*b*, and the third over-current counter 172*c* will be referred to as a carry over-current counter 172*a*, a scan over-current counter 172*b*, and a sensing over-current counter 172*c*, respectively.

The carry current sensor 171*a* may generate a carry current CR_I based on the carry on-clock signal CR_ON_CLK, the carry off-clock signal CR_OFF_CLK, a carry clock current CR_CLK_I, and a current detection signal CD. The carry current CR_I may be the carry clock current CR_CLK_I sensed at at least one time point among time points when the rising edge and the falling edge of the carry on-clock signal CR_ON_CLK are generated and time points when the rising edge and the falling edge of the carry off-clock signal CR_OFF_CLK are generated which are determined based on the current detection signal CD.

The scan current sensor 171*b* may generate a scan current SC_I based on the scan on-clock signal SC_ON_CLK, the scan off-clock signal SC_OFF_CLK, a scan clock current SC_CLK_I, and the current detection signal CD. The scan current SC_I may be the scan clock current SC_CLK_I sensed at at least one time point among time points when the rising edge and the falling edge of the scan on-clock signal SC_ON_CLK are generated and time points when the rising edge and the falling edge of the scan off-clock signal SC_OFF_CLK are generated which are determined based on the current detection signal CD.

The sensing current sensor 171*c* may generate a sensing current SS_I based on the sensing on-clock signal SS_ON_CLK, the sensing off-clock signal SS_OFF_CLK, a sensing clock current SS_CLK_I, and the current detection signal CD. The sensing current SC_I may be the sensing clock current SC_CLK_I sensed at at least one time point among time points when the rising edge and the falling edge of the sensing on-clock signal SS_ON_CLK are generated and time points when the rising edge and the falling edge of the sensing off-clock signal SS_OFF_CLK are generated which are determined based on the current detection signal CD.

The carry over-current counter 172*a* may count an over-current detection period by determining the carry current CR_I as an over-current when the carry current CR_I is greater than a reference current. The carry over-current counter 172*a* may output a short-circuit signal SS when the counting number of the over-current detection period is greater than a reference counting number.

The scan over-current counter 172*b* may count an over-current detection period by determining the scan current SC_I as the over-current when the scan current SC_I is greater than the reference current. The scan over-current counter 172*b* may output the short-circuit signal SS when the counting number of the over-current detection period is greater than the reference counting number.

The sensing over-current counter 172*c* may count an over-current detection period by determining the sensing current SS_I as the over-current when the sensing current SS_I is greater than the reference current. The sensing over-current counter 172*c* may output the short-circuit signal SS when the counting number of the over-current detection period is greater than the reference counting number.

The short-circuit determiner 173 may generate the shutdown signal SD in response to the short-circuit signal SS when receiving at least one short-circuit signal SS from the carry over-current counter 172*a*, the scan over-current counter 172*b*, and the sensing over-current counter 172*c*. In an embodiment, the short-circuit determiner 173 may be an OR gate logic circuit.

The over-current detector 170 may further include a current detection resistor 174.

The current detection register 174 may store information indicating a current detection mode regarding the current to be detected. In an embodiment, the information stored in the current detection register 174 may indicate an on-current detection mode for detecting on-currents of the carry clock current CR_CLK_I, the scan clock current SC_CLK_I, and the sensing clock current SS_CLK_I and an off-current detection mode for detecting off-currents of the carry clock current CR_CLK_I, the scan clock current SC_CLK_I, and the sensing clock current SS_CLK_I. In an embodiment, when the display device 10 is powered on, the information indicating the current detection mode may be written in the current detection register 174, and the current detection signal CD corresponding to the current detection mode may be generated and supplied to the carry current sensor 171*a*, the scan current sensor 171*b*, and the sensing current sensor 171*c*, and the over-current detector 170 may sense the carry clock current CR_CLK_I, the scan clock current SC_CLK_I, and the sensing clock current SS_CLK_I based on the current detection signal CD.

Figure 13:
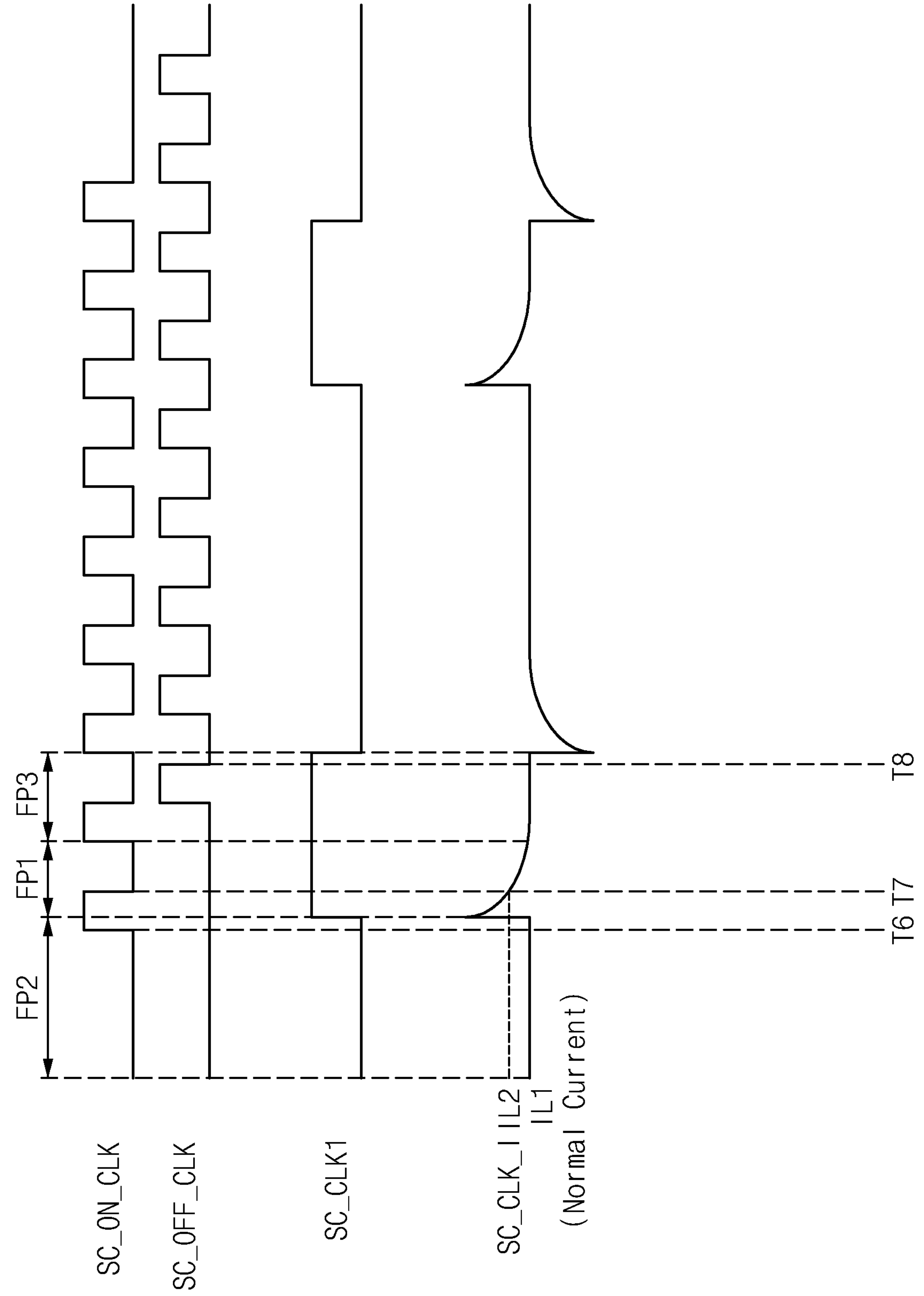
FIGS. 13 and 14 are timing diagrams for describing an example of an operation of the over-current detector in FIG. 12.
Figure 14:
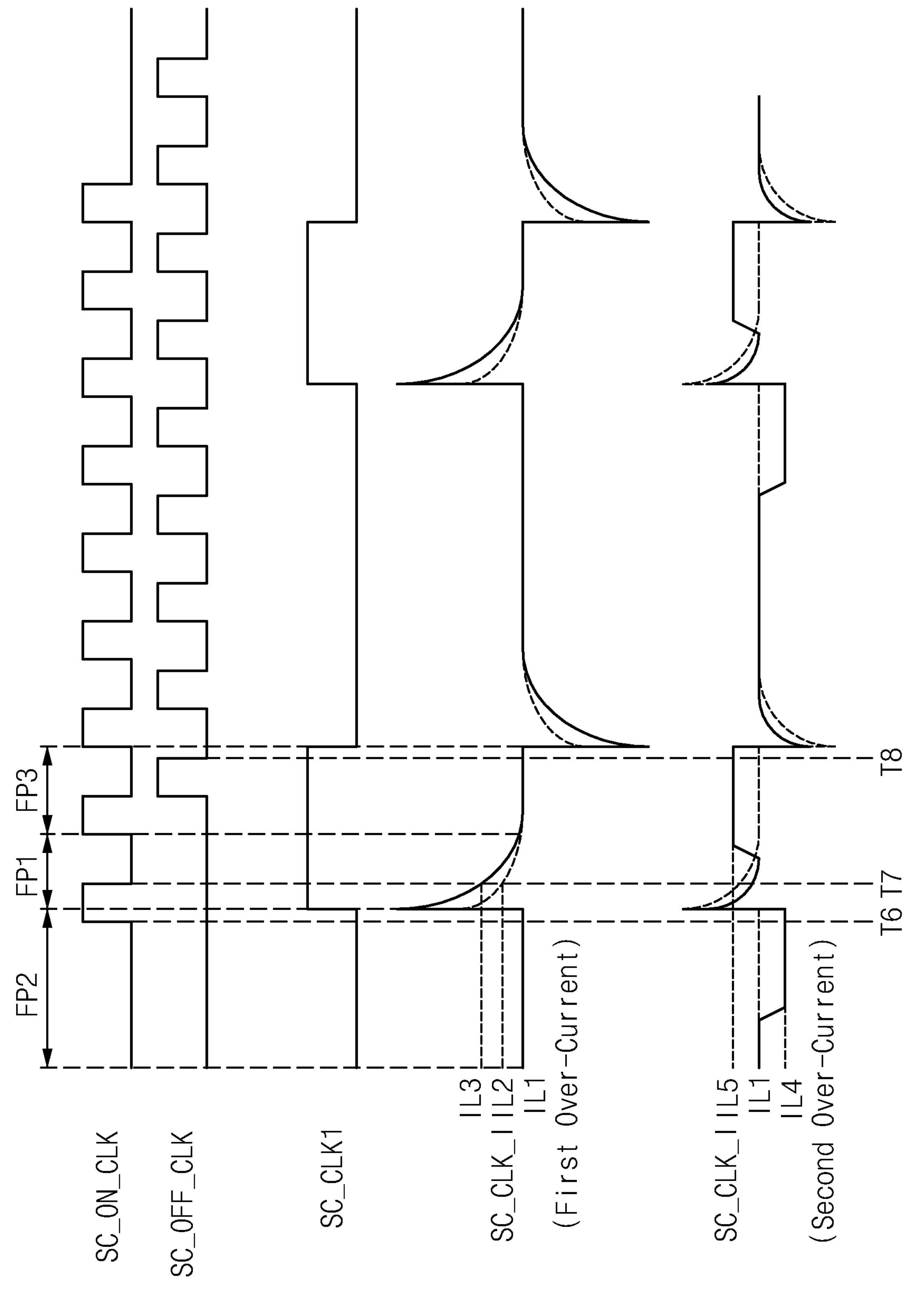

FIGS. 13 and 14 are timing diagrams for describing an example of an operation of the over-current detector 170 in FIG. 12. FIG. 13 may illustrate the scan clock current SC_CLK_I that is a normal current in the kickback-off mode, and FIG. 14 may illustrate the scan clock currents SC_CLK_I that are over-currents in the kickback-off mode.

Referring to FIGS. 13 and 14, a rising edge of the scan clock current SC_CLK_I may be generated in response to the rising edge of the scan clock signal SC_CLK1, and the scan clock current SC_CLK_I may have a current level of an on-current higher than a first current level IL1 of about 0 A during a predetermined first time period FP1 after the rising edge of the scan clock current SC_CLK_I. In the on-current detection mode and the kickback-off mode, the over-current detector 170 may sense the scan clock current SC_CLK_I of the scan clock signal SC_CLK1 at a time point T7 when the falling edge of the scan on-clock signal SC_ON_CLK is generated. The time point T7 may be within the first time period FP1, and accordingly, the scan clock current SC_CLK_I may have the current level of the on-current at the time point T7.

When the scan clock current SC_CLK_I is a normal current, the scan clock current SC_CLK_I may have a second current level IL2 at the time point T7. When the scan clock current SC_CLK_I is a first over-current due to a short-circuit in a wire that transmits the scan clock signal SC_CLK1 or the like, the scan clock current SC_CLK_I may have a third current level IL3 higher than the second current level IL2 at the time point T7. In the on-current detection mode and the kickback-off mode, when the scan clock current SC_CLK_I is the first over-current, the over-current detector 170 may sense the scan clock current SC_CLK_I of the scan clock signal SC_CLK1 at the time point T7, and may compare the third current level IL3 of the sensed scan clock current SC_CLK_I with the second current level IL2 of the scan clock current SC_CLK_I which is the normal current. Accordingly, the first over-current of the scan clock current SC_CLK_I may be detected.

In the kickback-off mode, the rising edge of the scan clock current SC_CLK_I may be generated in response to the rising edge of the scan clock signal SC_CLK1, and a falling edge of the scan clock current SC_CLK_I may be generated in response to the falling edge of the scan clock signal SC_CLK1. The scan clock current SC_CLK_I may have a current level of an off-current during a second time period FP2 before the rising edge of the scan clock current SC_CLK_I and during a third time period FP3 before the falling edge of the scan clock current SC_CLK_I. In the off-current detection mode and the kickback-off mode, the over-current detector 170 may sense the scan clock current SC_CLK_I of the scan clock signal SC_CLK1 at a time point T6 when the rising edge of the scan on-clock signal SC_ON_CLK is generated and at a time point T8 when the falling edge of the scan off-clock signal SC_OFF_CLK is generated. Due to a time delay of the scan clock signal SC_CLK1 with respect to the scan on-clock signal SC_ON_CLK and the scan off-clock signal SC_OFF_CLK, the time point T6 may be within the second time period FP2, and the time point T8 may be within the third time period FP3. Accordingly, the scan clock current SC_CLK_I may have the current level of the off-current at the time point T6 and at the time point T8.

When the scan clock current SC_CLK_I is a normal current, the scan clock current SC_CLK_I may have the first current level IL1 at the time point T6 and at the time point T8. When the scan clock current SC_CLK_I is a second over-current due to a short-circuit in a wire that transmits the scan clock signal SC_CLK1 or the like, the scan clock current SC_CLK_I may have a fourth current level IL4 lower than the first current level IL1 at the time point T6, and the scan clock current SC_CLK_I may have a fifth current level IL5 higher than the first current level IL1 at the time point T8. In the off-current detection mode and the kickback-off mode, when the scan clock current SC_CLK_I is the second over-current, the over-current detector 170 may sense the scan clock current SC_CLK_I of the scan clock signal SC_CLK1 at the time point T6 *w* and at the time point T8, and may compare the fourth current level IL4 and the fifth current level IL5 of the sensed scan clock current SC_CLK_I with the first current level IL1 of the scan clock current SC_CLK_I which is the normal current. Accordingly, the second over-current of the scan clock current SC_CLK_I may be detected.

The over-current detector 170 may sense the carry clock current CR_CLK_I and the sensing clock current SS_CLK_I similarly to the scan clock current SC_CLK_I described with reference to FIGS. 13 and 14 thereby detecting over-currents of the carry clock current CR_CLK_I and the sensing clock current SS_CLK_I.

Figure 15:
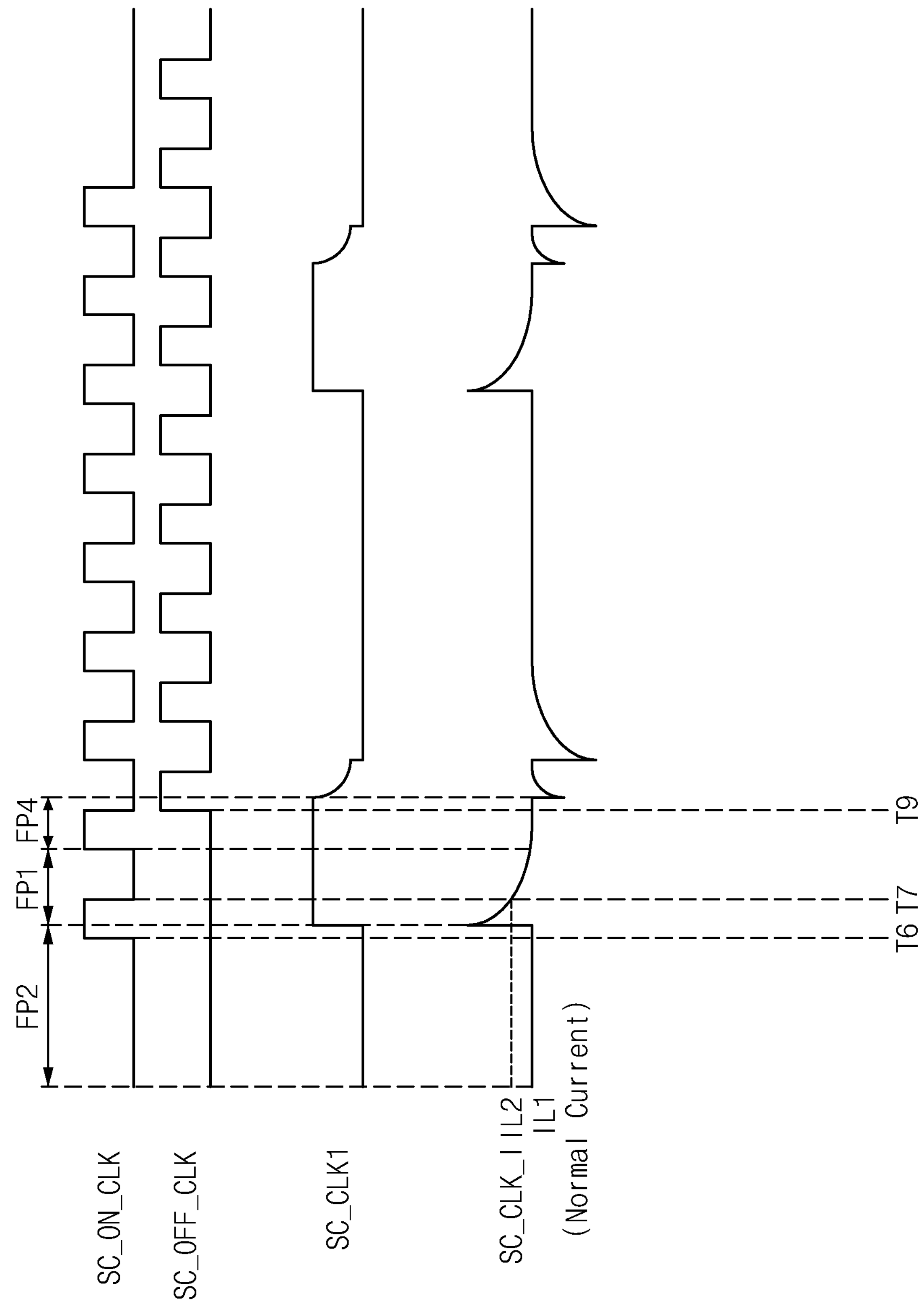
FIGS. 15 and 16 are timing diagrams for describing an example of an operation of the over-current detector in FIG. 12.
Figure 16:
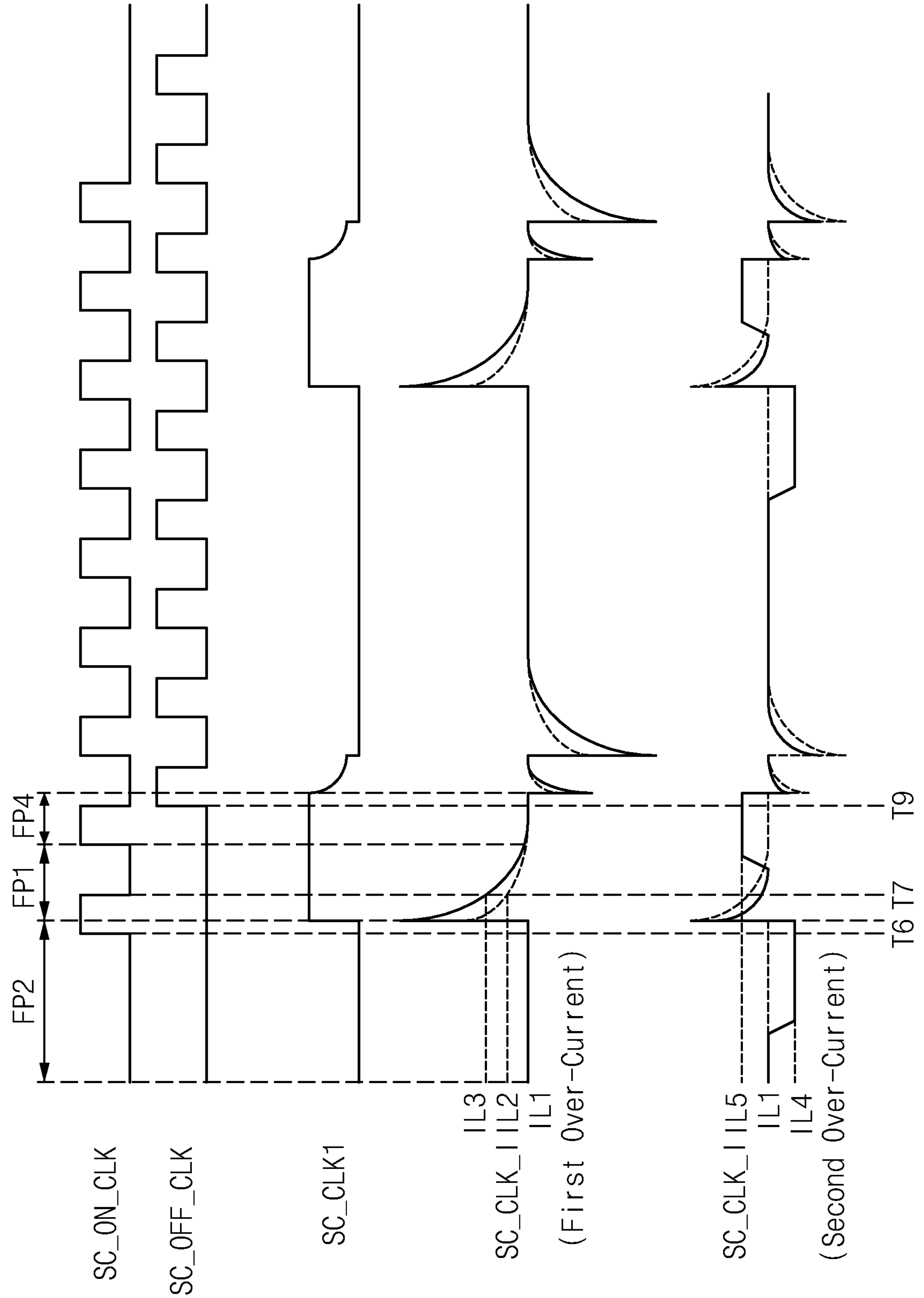

FIGS. 15 and 16 are timing diagrams for describing an example of an operation of the over-current detector 170 in FIG. 12. FIG. 15 may illustrate the scan clock current SC_CLK_I that is a normal current in the kickback-on mode, and FIG. 16 may illustrate the scan clock currents SC_CLK_I that are over-currents in the kickback-on mode.

Referring to FIGS. 15 and 16, in the on-current detection mode and the kickback-on mode, the over-current detector 170 may sense the scan clock current SC_CLK_I of the scan clock signal SC_CLK1 at a time point T7. The time point T7 when the scan clock current SC_CLK_I is sensed in the on-current detection mode and the kickback-on mode may be the same as the time point T7 when the scan clock current SC_CLK_I is sensed in the on-current detection mode and the kickback-off mode described with reference to FIGS. 13 and 14.

In the kickback-on mode, the rising edge of the scan clock current SC_CLK_I may be generated in response to the rising edge of the scan clock signal SC_CLK1 at the rising edge of the scan clock signal SC_CLK1, and the falling edge of the scan clock current SC_CLK_I may be generated in response to a start of a gradual decrease in a voltage level of the pulse of the scan clock signal SC_CLK1 at a time point when the voltage level of the pulse of the scan clock signal SC_CLK1 starts to gradually decrease. The scan clock current SC_CLK_I may have a current level of the off-current during the second time period FP2 before the time point when the rising edge of the scan clock current SC_CLK_I is generated and during a fourth time period FP4 before the time point when the voltage level of the pulse of the scan clock signal SC_CLK1 starts to gradually decrease. In the off-current detection mode and the kickback-on mode, the over-current detector 170 may sense the scan clock current SC_CLK_I of the scan clock signal SC_CLK1 at the time point T6 when the rising edge of the scan on-clock signal SC_ON_CLK is generated and at a time point T9 when the rising edge of the scan off-clock signal SC_OFF_CLK is generated. Due to a time delay of the scan clock signal SC_CLK1 with respect to the scan on-clock signal SC_ON_CLK and the scan off-clock signal SC_OFF_CLK, the time point T6 may be within the second time period FP2, and the time point T9 may be within the fourth time period FP4. Accordingly, the scan clock current SC_CLK_I may have a current level of the off-current at the time point T6 *w* and at the time point T9.

When the scan clock current SC_CLK_I is a normal current, the scan clock current SC_CLK_I may have the first current level IL1 at the time point T6 and at the time T9. When the scan clock current SC_CLK_I is the second over-current due to a short-circuit in a wire that transmits the scan clock signal SC_CLK1 or the like, the scan clock current SC_CLK_I may have the fourth current level IL4 lower than the first current level IL1 at the time point T6, and the scan clock current SC_CLK_I may have the fifth current level IL5 higher than the current level IL1 at the time point T9. In the off-current detection mode and the kickback-on mode, when the scan clock current SC_CLK_I is the second over-current, the over-current detector 170 may sense the scan clock current SC_CLK_I of the scan clock signal SC_CLK1 at the time point T6 and at the time point T9, and may compare the fourth current level IL4 and the fifth current level IL5 of the sensed scan clock current SC_CLK_I with the first current level IL1 of the scan clock current SC_CLK_I which is the normal current. Accordingly, the second over-current of the scan clock current SC_CLK_I may be detected.

The over-current detector 170 may sense the carry clock current CR_CLK_I and the sensing clock current SS_CLK_I similarly to the scan clock current SC_CLK_I described with reference to FIGS. 15 and 16 thereby detecting over-currents of the carry clock current CR_CLK_I and the sensing clock current SS_CLK_I.

In the embodiments described with reference to FIGS. 13 to 16, the over-current detector 170 may sense the on-current of the carry/scan/sensing clock signal CR_CLK1/SC_CLK1/SS_CLK1 at the falling edge of the carry/scan/sensing on-clock signal CR_ON_CLK/SC_ON_CLK/SS_ON_CLK, and may sense the off-current of the carry/scan/sensing clock signal CR_CLK1/SC_CLK1/SS_CLK1 at the rising edge of the carry/scan/sensing on-clock signal CR_ON_CLK/SC_ON_CLK/SS_ON_CLK and the falling edge or the rising edge of the carry/scan/sensing off-clock signal CR_OFF_CLK/SC_OFF_CLK/SS_OFF_CLK, so that the deviation in the time point of detecting the over-current may decrease.

The display device according to the embodiments may be applied to a display device included in a computer, a notebook, a mobile phone, a smart phone, a smart pad, a PMP, a PDA, an MP3 player, or the like.

Although the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a timing controller which generates an on-clock signal, an off-clock signal, and a start signal;

a level shifter which sequentially generates gate clock signals each having a rising edge and a falling edge respectively synchronized with a rising edge of the on-clock signal and a falling edge of the off-clock signal, the gate clock signals having a voltage corresponding to a gate driving voltage;

a gate driver which generates a plurality of gate signals based on the gate clock signals;

a display panel which includes a plurality of pixels emitting light;

an over-current detector which detects an over-current by sensing a current of each of the gate clock signals at the falling edge of the on-clock signal in an on-current detection mode, and generates a shutdown signal in response to the detected over-current; and a voltage generator which provides the gate driving voltage to the level shifter and stops providing the gate driving voltage in response to the generated shutdown signal, wherein, when a pulse of the start signal occurs during a generation of the gate clock signals, the level shifter stops the generation of the gate clock signals and sequentially generates the gate clock signals starting from a first gate clock signal in response to the pulse of the start signal.

2. The display device of claim 1, wherein the level shifter generates the same number of gate clock signals as a preset number of channels.

3. The display device of claim 2, wherein the preset number of the channels is a natural number of 2 to 8.

4. The display device of claim 1, wherein the timing controller generates the start signal, and wherein the level shifter sequentially generates the gate clock signals in response to a pulse of the start signal in a reset-on mode.

5. The display device of claim 4, wherein a rising edge of the first gate clock signal is disposed between a rising edge of the start signal and a falling edge of the start signal.

6. The display device of claim 1, wherein the level shifter gradually decreases a pulse included in each of the gate clock signals from a first voltage level to a second voltage level lower than the first voltage level from a rising edge of the off-clock signal to the falling edge of the off-clock signal in a kickback-on mode.

7. The display device of claim 6, wherein the over-current detector detects the over-current by sensing a current of each of the gate clock signals at the rising edge of the on-clock signal and at the falling edge or the rising edge of the off-clock signal in an off-current detection mode.

8. The display device of claim 7, wherein the over-current detector detects the over-current by sensing a current of each of the gate clock signals at the rising edge of the on-clock signal and at the falling edge of the off-clock signal in the off-current detection mode and a kickback-off mode.

9. The display device of claim 7, wherein the over-current detector detects the over-current by sensing a current of each of the gate clock signals at the rising edge of the on-clock signal and at the rising edge of the off-clock signal in the off-current detection mode and the kickback-on mode.

10. The display device of claim 1, wherein the timing controller generates a gate enable signal, wherein the level shifter generates a gate clock signal including a pulse having a rising edge and a falling edge respectively synchronized with the rising edge of the on-clock signal and the falling edge of the off-clock signal while the gate enable signal has a first voltage level, and wherein the level shifter generates a gate clock signal not including the pulse while the gate enable signal has a second voltage level different from the first voltage level.

11. A display device, comprising:

a timing controller which generates clock signals including an on-clock signal, an off-clock signal, and a start signal;

a level shifter which sequentially generates gate clock signals each having a rising edge and a falling edge respectively synchronized with a rising edge of the on-clock signal and a falling edge of the off-clock signal;

a gate driver which generates a plurality of gate signals based on the gate clock signals; and a display panel which includes a plurality of pixels emitting light, wherein, when a pulse of the start signal occurs during a generation of the gate clock signals, the level shifter stops the generation of the gate clock signals and sequentially generates the gate clock signals starting from a first gate clock signal in response to the pulse of the start signal.

12. The display device of claim 11, wherein a number of the gate clock signals is greater than or equal to a number of the clock signals.

13. The display device of claim 12, wherein the number of the gate clock signals is a natural number of 2 to 8.

14. The display device of claim 11, wherein the timing controller generates the start signal, and wherein the level shifter sequentially generates the gate clock signals in response to a pulse of the start signal in a reset-on mode.

15. The display device of claim 11, wherein the level shifter gradually decreases a pulse included in each of the gate clock signals from a first voltage level to a second voltage level lower than the first voltage level from a rising edge of the off-clock signal to the falling edge of the off-clock signal in a kickback-on mode.

16. The display device of claim 11, wherein the timing controller generates a gate enable signal, wherein the level shifter generates a gate clock signal including a pulse having a rising edge and a falling edge respectively synchronized with the rising edge of the on-clock signal and the falling edge of the off-clock signal while the gate enable signal has a first voltage level, and wherein the level shifter generates a gate clock signal not including the pulse while the gate enable signal has a second voltage level different from the first voltage level.

17. A display device, comprising:

a timing controller which generates an on-clock signal and an off-clock signal;

a level shifter which sequentially generates gate clock signals each having a rising edge and a falling edge respectively synchronized with a rising edge of the on-clock signal and a falling edge of the off-clock signal, the gate clock signals having a voltage corresponding to a gate driving voltage;

a gate driver which generates a plurality of gate signals based on the gate clock signals;

a display panel which includes a plurality of pixels emitting light;

an over-current detector which detects an over-current by sensing a current of each of the gate clock signals at the rising edge of the on-clock signal and at the falling edge or a rising edge of the off-clock signal in an off-current detection mode, and generates a shutdown signal in response to the detected over-current; and a voltage generator which provides the gate driving voltage to the level shifter and stops providing the gate driving voltage in response to the generated shutdown signal.

18. The display device of claim 17, wherein the level shifter gradually decreases a pulse included in each of the gate clock signals from a first voltage level to a second voltage level lower than the first voltage level from the rising edge of the off-clock signal to the falling edge of the off-clock signal in a kickback-on mode.

19. The display device of claim 18, wherein the over-current detector detects the over-current by sensing a current of each of the gate clock signals at the rising edge of the on-clock signal and at the falling edge of the off-clock signal in the off-current detection mode and a kickback-off mode.

20. The display device of claim 18, wherein the over-current detector detects the over-current by sensing a current of each of the gate clock signals at the rising edge of the on-clock signal and at the rising edge of the off-clock signal in the off-current detection mode and the kickback-on mode.

* * * * *